United States Patent [19]
Chapman

[11] Patent Number: 5,375,863
[45] Date of Patent: Dec. 27, 1994

[54] ELECTRONIC STEERING MODE SHIFTER

[75] Inventor: Leonard T. Chapman, North Hollywood, Calif.

[73] Assignee: Leonard Studio Equipment, Inc., North Hollywood, Calif.

[21] Appl. No.: 185,446

[22] Filed: Jan. 25, 1994

Related U.S. Application Data

[63] Continuation of Ser. No. 761,178, Sep. 16, 1991, abandoned, which is a continuation-in-part of Ser. No. 591,524, Oct. 1, 1990, Pat. No. 5,174,593.

[51] Int. Cl.⁵ .......................................... B60K 17/358
[52] U.S. Cl. .................................... 280/99; 74/496; 180/234; 280/91
[58] Field of Search ............... 180/234; 280/91, 99, 280/100, 47.11; 74/496; 248/129

[56] References Cited

U.S. PATENT DOCUMENTS

| 2,715,534 | 8/1955 | Hoge et al. | |
| 2,756,066 | 7/1956 | Ludowici | |
| 2,842,376 | 7/1958 | Krilanovich | |
| 3,018,116 | 1/1962 | Summers et al. | |
| 3,134,455 | 5/1964 | Fiorentini | |
| 4,003,584 | 1/1977 | Zelli | 280/47.11 |
| 4,248,444 | 2/1901 | Johnson | |
| 4,257,619 | 3/1981 | Fisher | |
| 4,335,626 | 6/1983 | Fisher | |
| 4,947,326 | 8/1990 | Mori et al. | 280/91 |
| 4,950,126 | 8/1990 | Fabiano et al. | 280/91 |

FOREIGN PATENT DOCUMENTS 2450692 4/1976 Germany .................. 280/33.991

Primary Examiner—Eric D. Culbreth
Attorney, Agent, or Firm—Lyon & Lyon

[57] ABSTRACT

A steering compensator has a shaft with a first shaft section offset from a central shaft section. A second shaft section of the shaft is offset from the first and central shaft sections. A first drive member is rotatably attached to the first shaft section and a second drive member is rotatably attached to the second shaft section. A central member is rotatably attached to the central shaft section between the first and second drive members. A pivotal link interconnects the first and second drive members through the central member to allow relative angular displacement between the first and second drive members. The steering compensator provides steering angle correction in conventional steering. A crab-conventional camera dolly steering shift mechanism has shift plates and sprockets aligned on a shaft. An electronic shifter automatically shifts between crab and conventional steering modes.

17 Claims, 23 Drawing Sheets

TABLE 1

| r = | 131.00 | 61.00 | 30.50 | 15.25 | 7.62 | 0.0 | -5.04 | -10.079 |
|---|---|---|---|---|---|---|---|---|
| a = | 14.04 | 28.24 | 47.04 | 65.04 | 76.91 | 90.00 | 98.75 | 107.10 |
| b = | 12.23 | 21.98 | 32.89 | 42.77 | 49.70 | 58.39 | 65.23 | 72.90 |

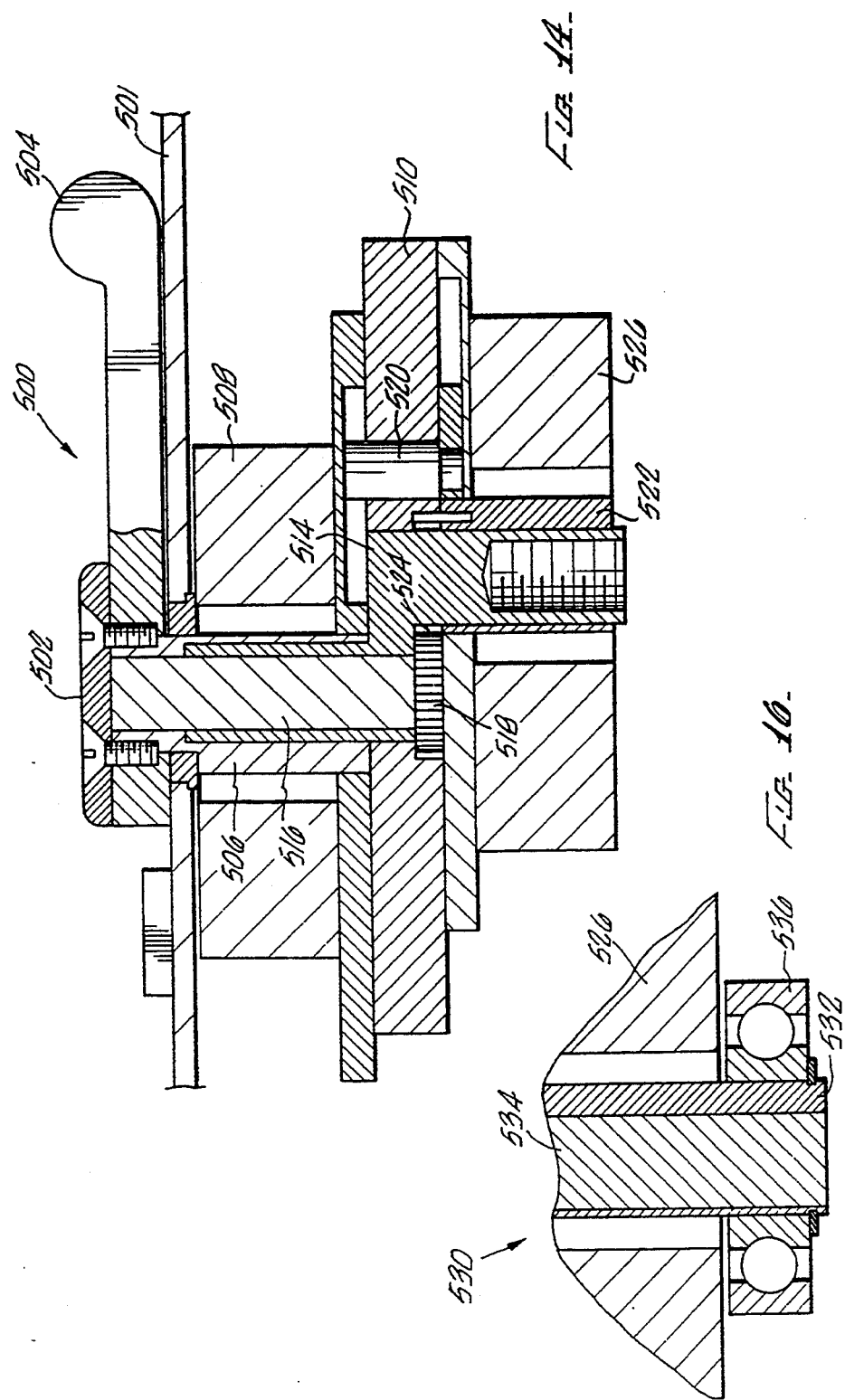

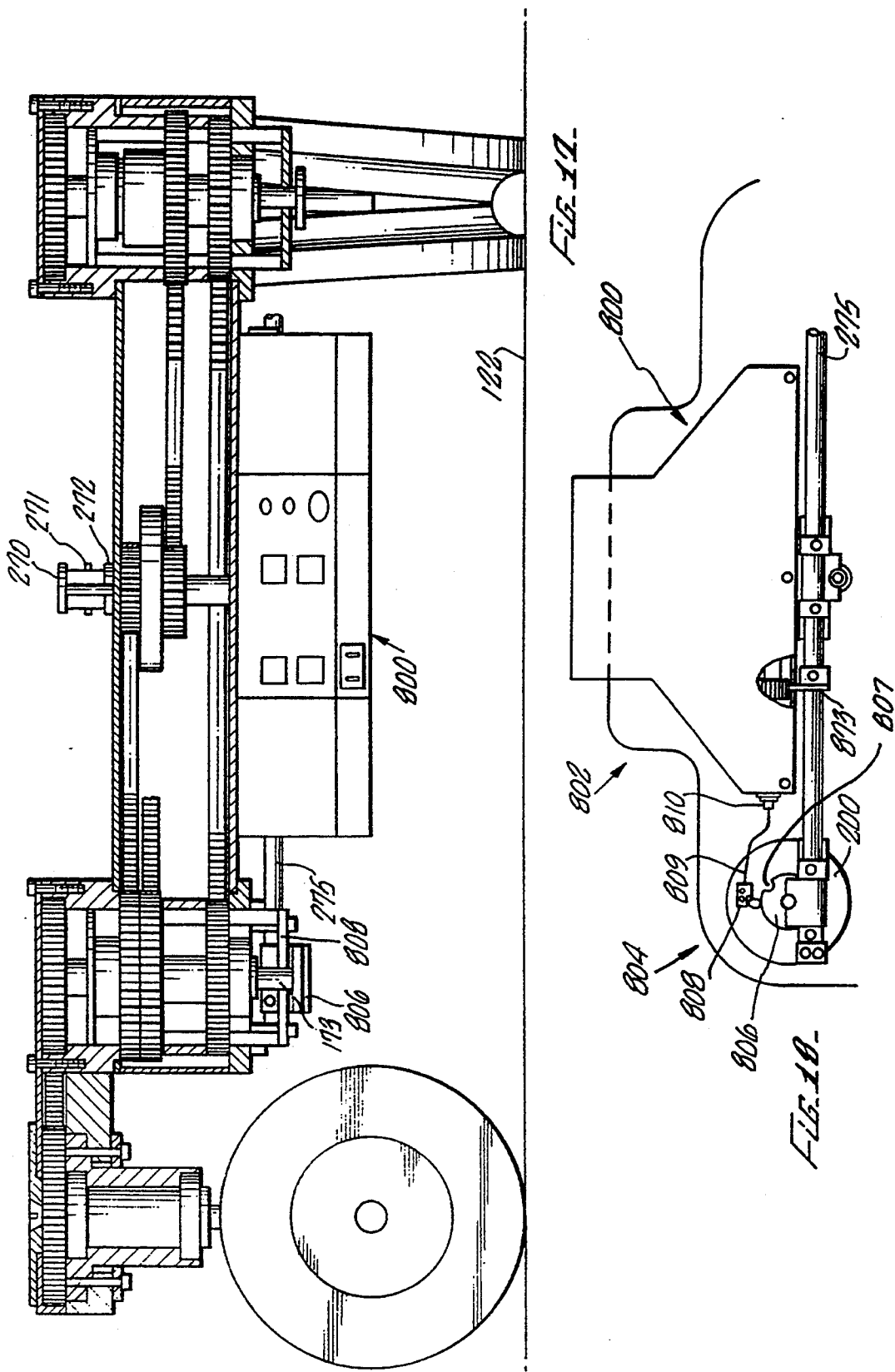

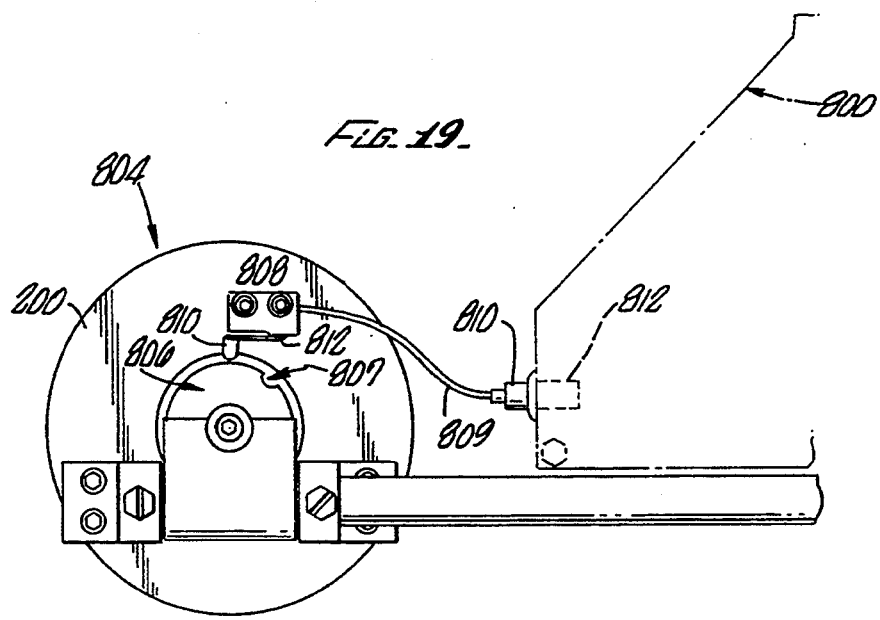
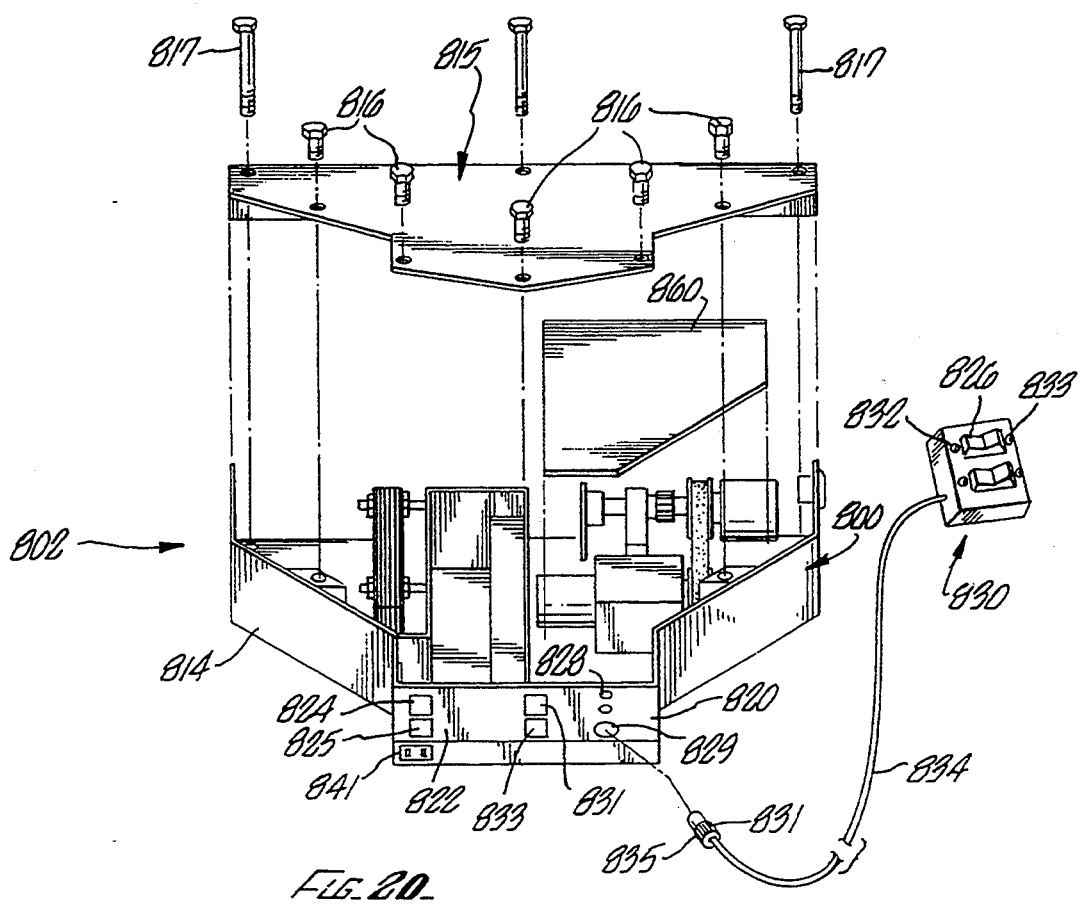

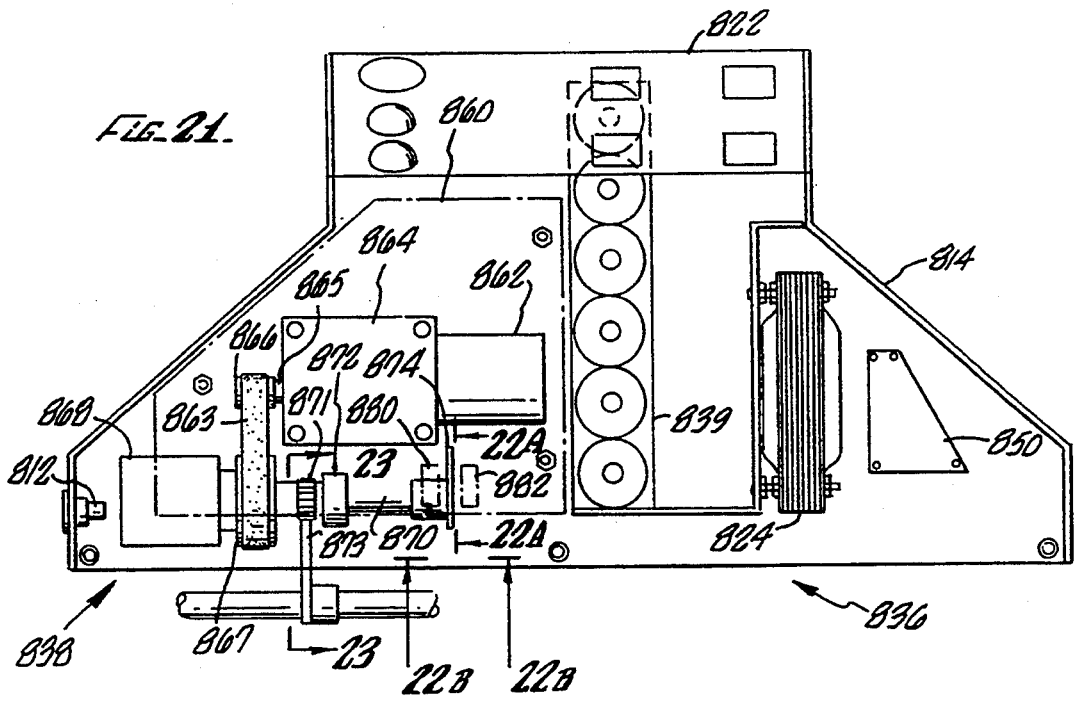
Fig. 21.
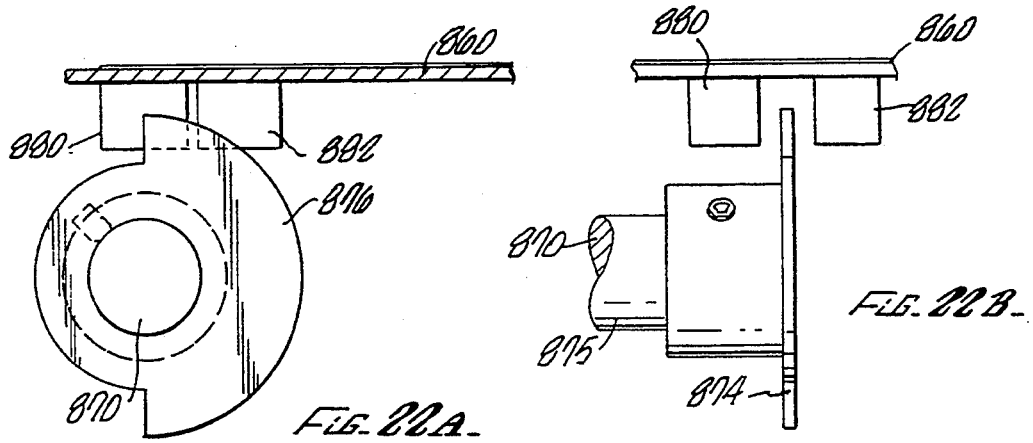
Fig. 22A.
Fig. 22B.
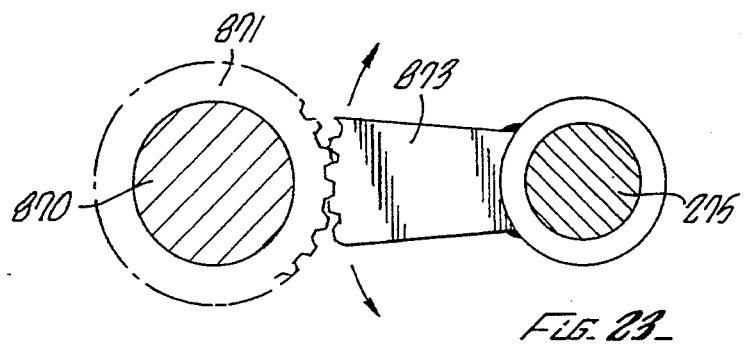
Fig. 23.

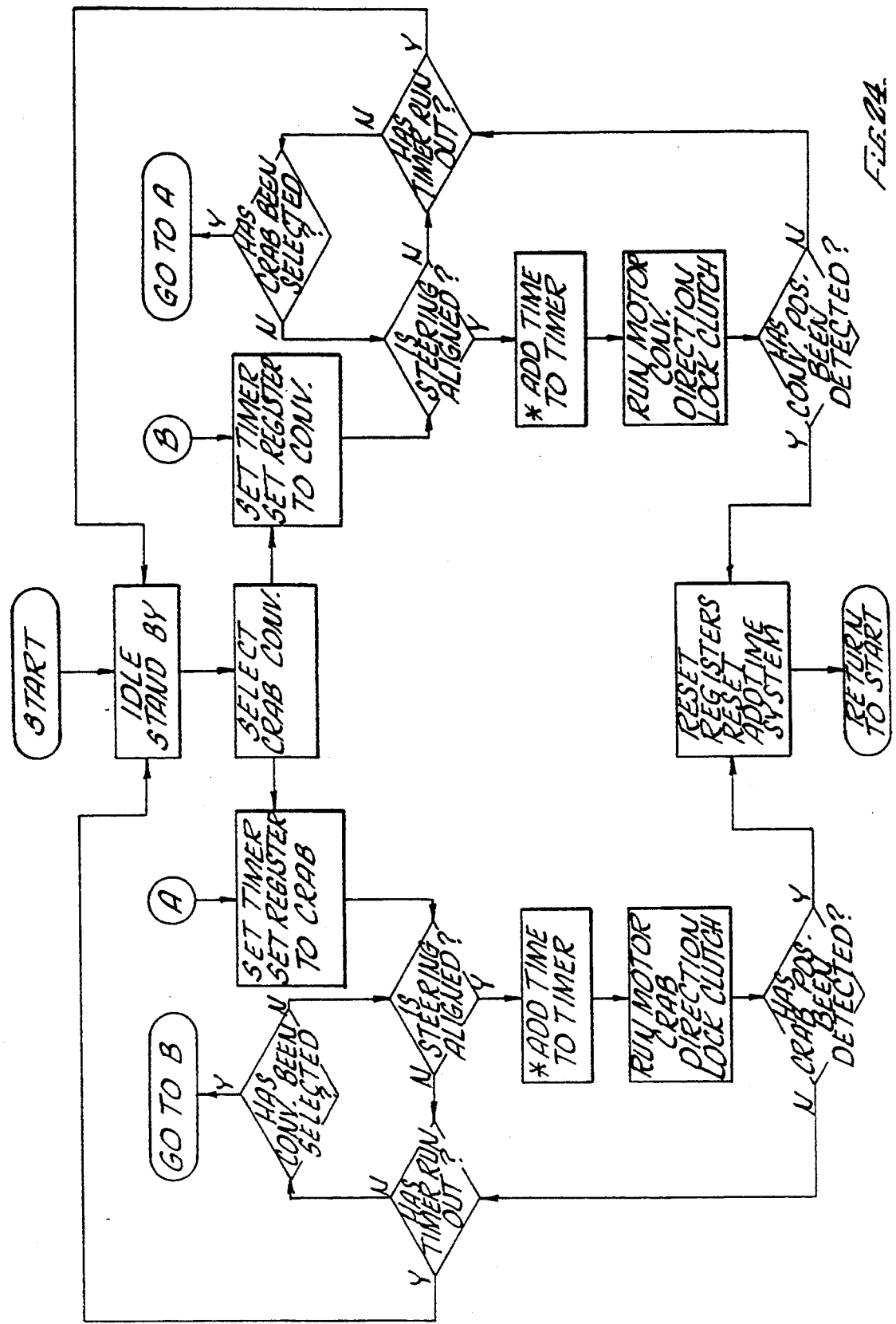

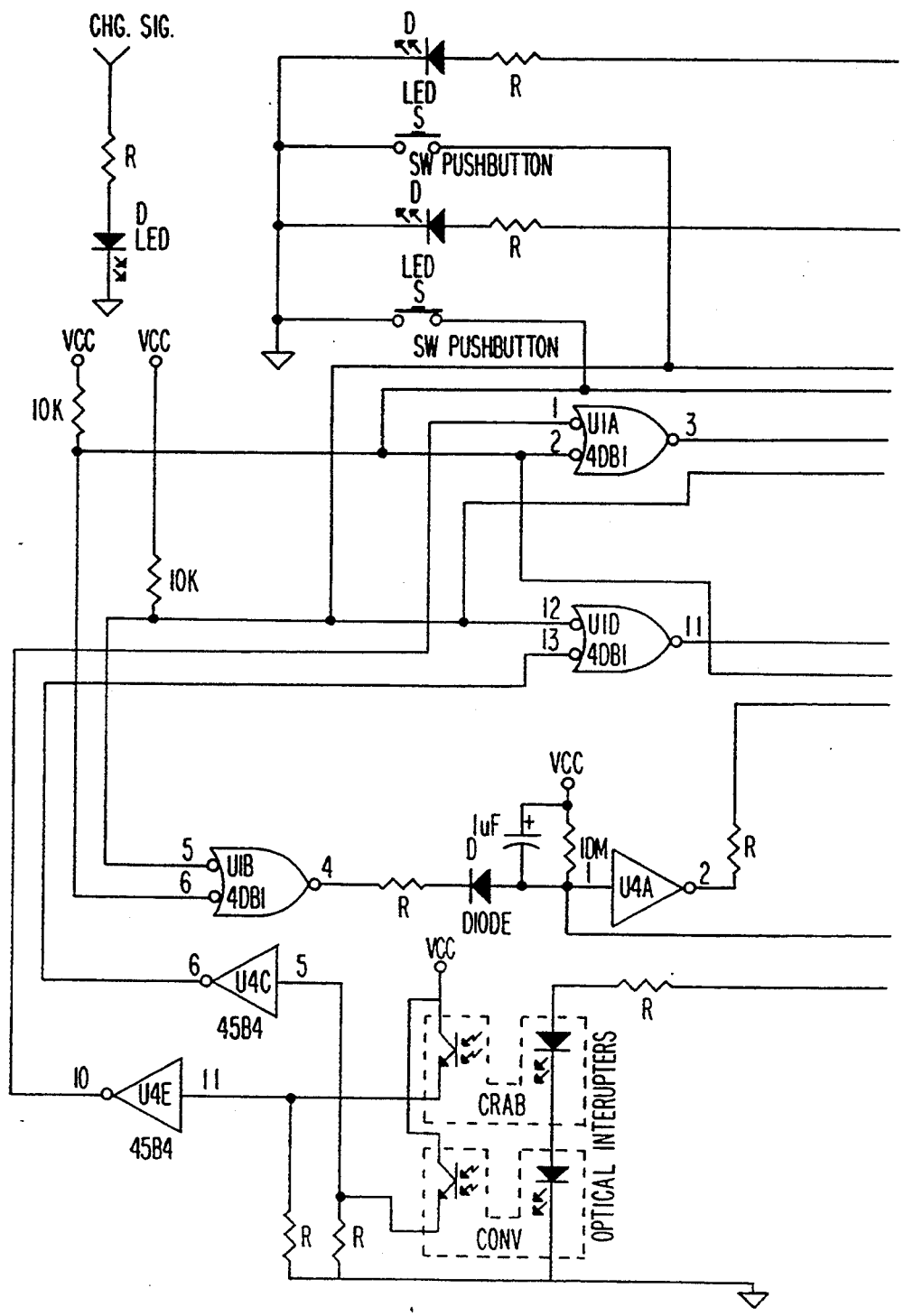

ELECTRONIC STEERING MODE SHIFTER

This application is a continuation of Ser. No. 07/761,178, filed on Sep. 16, 1991, and now abandoned, which in turn is a continuation-in-part of Ser. No. 591,524, filed Oct. 1, 1990, now U.S. Pat. No. 5,174,593. My concurrently filed Ser. No. 761,179, now U.S. Pat. No. 5,318,313 is incorporated herein by reference.

BACKGROUND OF THE INVENTION

The application relates to the field of mobile wheeled equipment and specifically to camera dollies and cranes used in the television and motion picture industries. In the production of television programs or motion pictures, it is often necessary to maneuver a camera between different filming positions. The required camera movement may include elevating and lowering the camera as well lateral and longitudinal movement between the camera and subject. Continuous translation of the camera, i.e., to follow an action or moving sequence is also occasionally called for. Camera cranes and dollies are employed to support the camera and perform the desired camera movement.

For filming in close quarters, a compact camera dolly is desired. For example, to fit through narrow doorways, the length and width of the camera dolly should be limited. With the advent of widespread "on location" filming, the camera dolly may have to be hand carried, e.g., up narrow stairways, across uneven outdoor terrain, etc. Accordingly, it is desirable for the camera dolly to be lightweight and easily carried.

It is important for the camera dolly to provide a stable platform for the camera, both at rest and when moving, since any shock, vibrations, jarring or rocking imparted by the dolly will cause the recorded film or video image sequence to "jump" unacceptably. Consequently, the dolly structure must be rigid and secure. The camera dolly should preferably also be capable of readily supporting not only a camera of substantial weight, but also a camera operator and a second individual such as a cinematographer, director, lighting specialist, etc. Preferably, the camera dolly is able to quickly, but silently and smoothly translate, rotate and elevate the camera. Quiet operation of all aspects of dolly movement, such as rolling, steering, turning and elevating or lowering a camera is especially important during the production of live television wherein even intermittent low or muffled equipment noise can be disruptive.

For added versatility, the camera dolly should be capable of both conventional steering and crab steering. In conventional steering, typically the front wheels remain fixed and the rear wheels steer. In crab steering, all of the dolly wheels are steered together, thereby permitting the dolly to be moved in any direction. In certain filming sequences, it is necessary to shift between conventional and crab steering modes. This shifting must be performed quickly and smoothly. In addition, the camera dolly operators or dolly grips must continue to smoothly push the dolly while steering mode shifting is made, during a filming sequence. This can be difficult because shifting has heretofore required a free arm or leg to actuate a shift handle or lever and because shifting can only occur when the wheels are properly aligned.

In conventional steering, to maintain acceptable steering performance while the dolly is steered on a curved path, a conventional steering corrector or transmission is required. See, for example, U.S. Pat. No. 4,003,584 to Zelli. The corrector adjusts the steering angle of the camera dolly wheels to allow the camera dolly to properly track a curved path. This prevents any scraping or scrubbing of the wheels against the floor or supporting surface which would tend to vibrate and disturb the camera and filming sequence as well as increasing rolling friction or resistance.

For translational filming sequences over uneven surfaces, for example on outdoor terrain, track rails can be laid to provide smooth rolling surface for the camera dolly. The camera dolly should accordingly be able to quickly and easily be set up for use on track rails.

Both 3-wheel and 4-wheel camera dollies or 3-corner pedestals have been proposed and used in the past (generally having dual wheels at each corner). Three-wheel configurations are advantageous as they are stable, i.e., a tripod configuration, even on uneven ground. However, three-wheel dollies or pedestals are not well suited for operation on track or allowing for passage through narrow doorways without incurring unexceptable levels of "tilt line" stability. Four-wheel camera dollies can perform well on track and have much larger wheelbase ranges but can be less stable than three-wheel units. For example, a slight bump under a wheel of a four-wheel unit can cause it to rock or tip slightly (due to one corner of the vehicle losing contact with the ground). This results in poor "tilt line" performance, whereas a three-wheel unit would be largely unaffected because all corners maintain ground contact. Consequently, heretofore, there have been tradeoffs to be weighed in selecting a three-wheel or a four-wheel design.

Accordingly, it is an object of the invention to provide a camera dolly having improved conventional steering performance.

It is a further object of the invention to provide such a camera dolly which is exceptionally quiet in operation.

It is yet another object of the invention to provide such a camera dolly which can be readily shifted between conventional steering and crab steering.

It is yet another object of the invention to provide such a dolly which is relatively lightweight and portable yet which provides a stable and secure camera platform.

It is still another object of the invention to provide a four wheel camera dolly having advantages of both a three-wheel configuration and a four-wheel configuration.

It is still another object of the invention to provide a combination camera dolly/pedestal having a separable pedestal which can be removed and used apart from the dolly.

It is yet another object of the invention to provide an electronic steering mode shifter for automatically shifting between conventional steering and crab steering in a camera dolly.

It is yet a further object of the invention to provide such a steering mode shifter which can be preset to eliminate the need for manually actuating a steering mode shift handle or lever.

It is a further object of the invention to provide such a shifter which shifts smoothly, quietly and quickly.

Other and further objects and advantages will appear hereinafter.

SUMMARY OF THE INVENTION

To these ends a steering compensator includes a shaft having a first shaft section and a central shaft section offset from the shaft section. A second section of the shaft is offset from the first and central shaft sections. A first drive member is pivotally or rotatably attached to the first shaft section and a second drive member is similarly attached to the second shaft section. A central member is pivotally or rotatably attached to the central shaft section in between the first and second drive members. A pivotal link connects the first and second drive members, through the central member, to allow relative angular displacement between the first and second drive members.

In an adjustable embodiment of the present steering compensator, an eccentric drive collar is rotatably mounted on a first shaft section. A knob or handle attached to the eccentric drive collar is used to shift the adjustable steering compensator between first and second configurations. The first configuration is used when the camera dolly legs are all positioned straight ahead (i.e., the narrowest dolly configuration) and for the 3-point simulation mode, (i.e., with the rear dolly legs close together and the front dolly legs spaced apart at a maximum distance, with the front dolly legs perpendicular to the sides of the dolly chassis). With the adjustable steering compensator shifted into its second mode, steering correction is provided when the dolly legs are in the track position (standard track wheel base being 24.56 in width). This may be the selected width for on the floor operation when not on track. (Steering on track is controlled by the track and the corrector is not in operation at that time.) The adjustable steering compensator accordingly, provides exceptionally accurate steering angle compensation for all required dolly leg configurations.

A manual steering mode shift apparatus for shifting between crab and conventional steering in a camera dolly comprises a housing and a first shift plate slidably supported on a shaft extending through the housing. A second shift plate is slidably supported on the shaft and spaced from the first shift plate. A support is positioned at least partially around the shaft and fixed to the housing. A shift mechanism is provided for reversibly shifting the second shift plate between a crab position and a conventional steering position.

A combination camera dolly and pedestal steering system comprises a displaceable steering wheel and an adjustable length shaft linking the steering wheel to a first sprocket or drive member. A first shift assembly has a crab sprocket, a conventional steering sprocket, and means for alternately linking the first sprocket with either the crab sprocket or conventional steering sprocket. A steering corrector is linked to the conventional steering sprocket. A crab drive line interconnects crab sprockets at each of the dolly legs. A second sprocket shift assembly has a crab sprocket, a conventional steering sprocket and means for linking either the conventional steering sprocket to the steering corrector or its crab sprocket to the crab drive line.

An electronic steering mode shifter includes a detector for detecting a wheel angle position, and a shift mechanism for automatically shifting the dolly steering system between conventional and crab steering. An electronic controller is connected to the detector and to an electric motor driving a drive shaft through a gear reducer and clutch. The drive shaft within the electronic shifter engages a pivot shaft of the camera dolly. A remote switch may be linked to the controller with a cable to facilitate shifting between steering modes without the operator being on or immediately adjacent to the camera dolly. Most desirably, the processor has a timer which counts the time elapsed between the operator's initiation of the shift sequence and the time when the dolly wheels are brought into alignment for shifting, i.e., into the 0° or 180° wheel positions. The shift shaft of the electronic shifter advantageously has a segment detector plate attached to one end and positioned in between a pair of optical sensors linked to the processor to detect when a shift is completed and stop the motor. The electronic shifter is preferably configured as an accessory or add-on unit with the shifter housing releasably attachable to the camera dolly.

BRIEF DESCRIPTION OF THE DRAWINGS

Other objects and features of the present invention will become apparent from the following detailed description taken in connection with the accompanying drawings. It is to be understood, however, that the drawings are designed for the purpose of illustration only and are not intended as a definition of the limits of the invention.

In the drawings, wherein similar reference characters denote similar elements throughout the several views:

FIG. 14 is a section view of a third embodiment of the present steering corrector;

FIG. 16 is a partial section view of an alternate embodiment of the steering corrector of FIG. 14;

FIG. 17 is a rear elevation view in part section showing the electronic shifter accessory attached to the camera dolly;

FIG. 18 is a bottom elevation view fragment also illustrating the electronic shifter attached to the camera dolly;

FIG. 19 is an enlarged bottom view fragment of the wheel angle position sensor;

FIG. 20 is a partially exploded perspective view of the electronic shifter housing;

FIG. 21 is a bottom elevation view of the electronic shifter mounted on the camera dolly, with the shifter housing cover removed;

FIG. 22A is an enlarged end view fragment taken along lines 22A—22A of FIG. 21;

FIG. 22B is an enlarged front elevation view fragment taken along line 22B—22B of FIG. 21;

FIG. 23 is an enlarged side elevation view fragment taken along line 23—23 of FIG. 21;

FIG. 24 is a flow chart illustrating the operation and control logic of the shifter;

DETAILED DESCRIPTION OF THE PREFERRED EMBODIMENT

Figure 1:
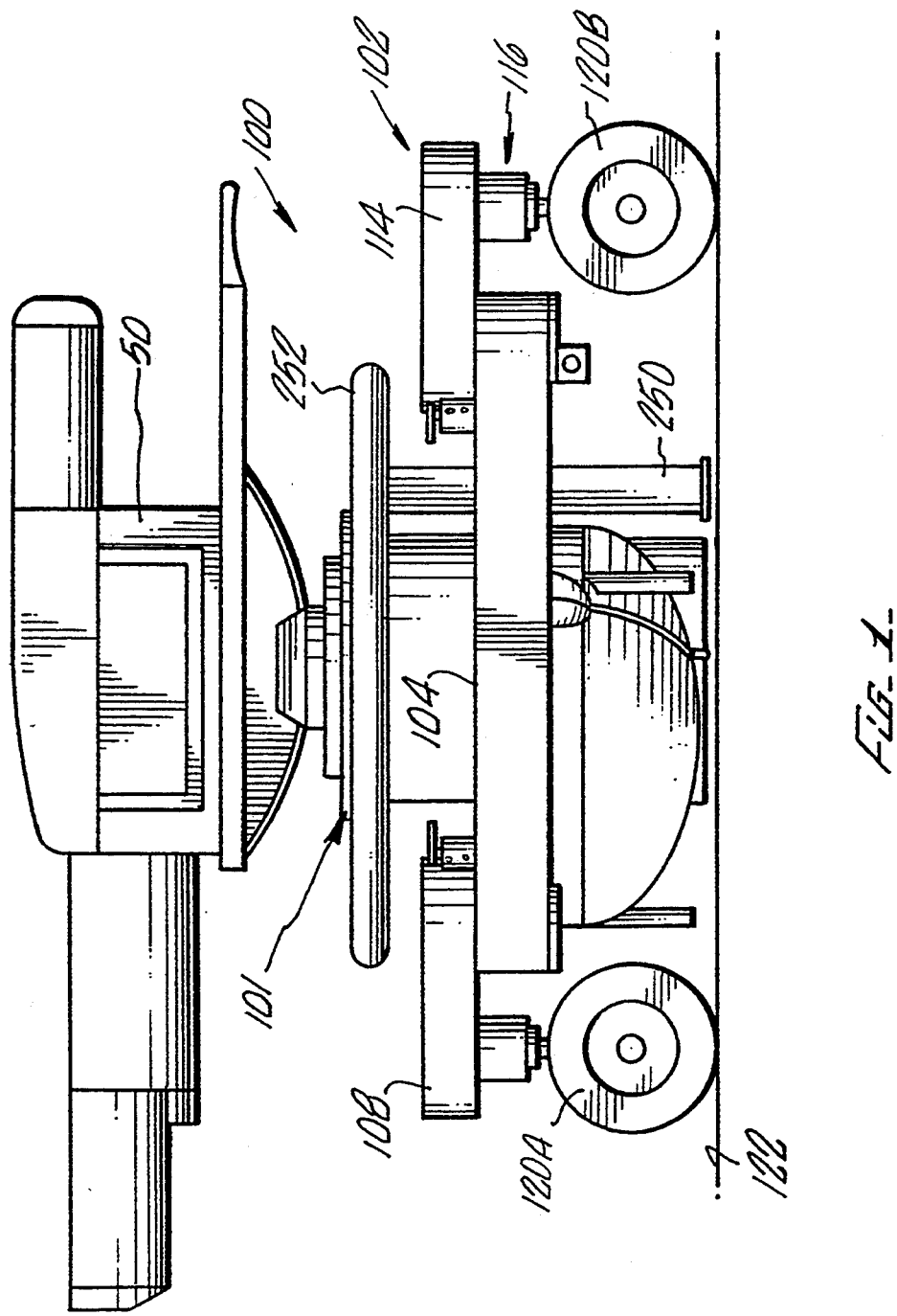
FIG. 1 is a left side elevation view of the present camera dolly including an associated pedestal supporting a camera.

Turning now in detail to the appended drawings, as shown in FIG. 1, a television or motion picture camera 50 is mounted on to a dolly/pedestal unit 100 comprising a dolly 102 and a separable pedestal 101. A description of the pedestal 101 is set forth in U.S. Pat. Nos. 5,197,700, and U.S. Pat. No. 5,318,313, both of which are incorporated herein by reference.

Figure 2:
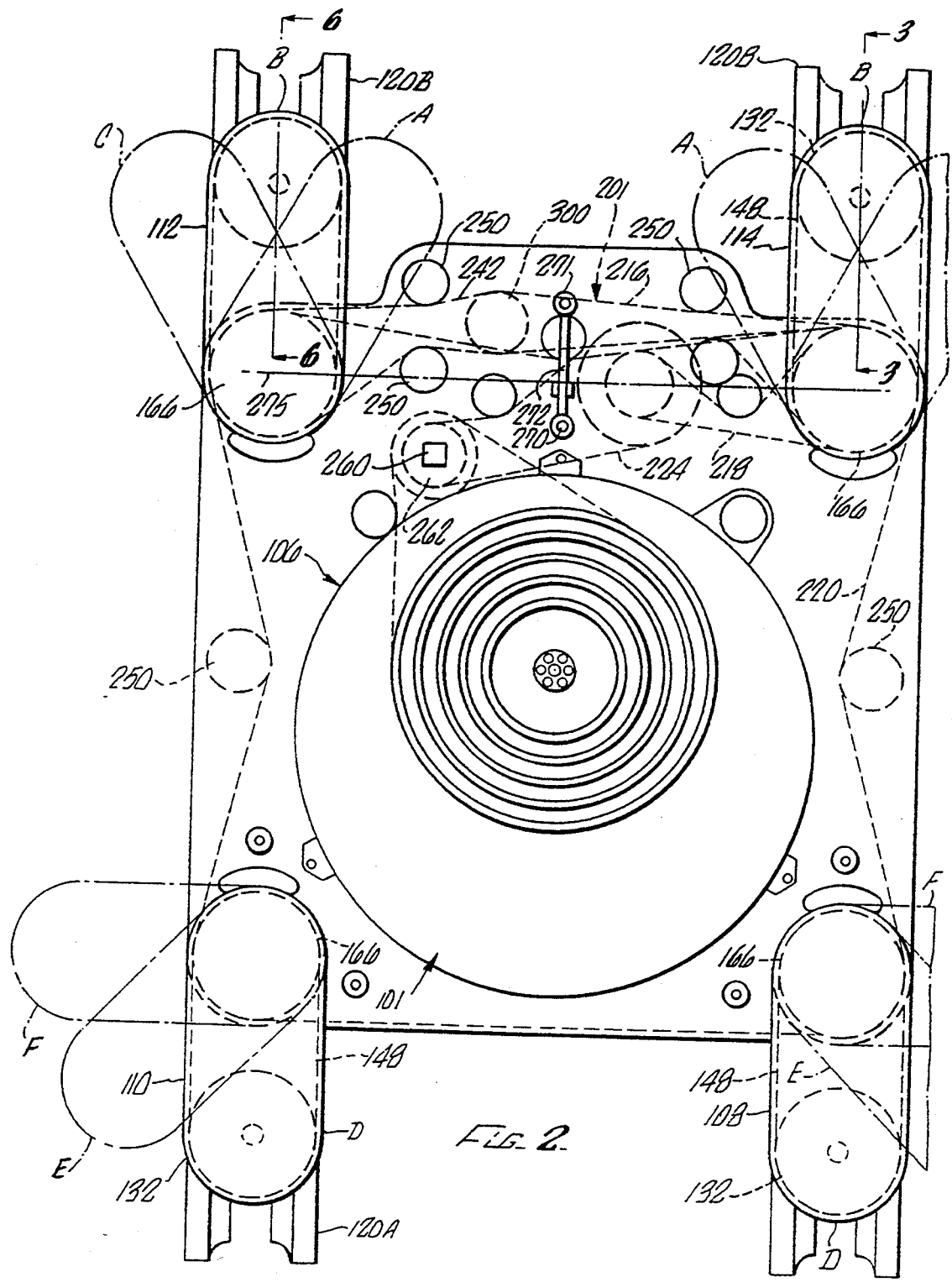
FIG. 2 is a schematically illustrated top view thereof with the camera platform and steering wheel removed and showing the present steering system.

The dolly 102 includes a dolly chassis 104 having a generally round pedestal opening 106 (FIG. 2) extending through the dolly chassis 104 for receiving and supporting the pedestal. Three or four recessed mounting positions with threaded holes are provided around the opening 106 for accepting and securing the pedestal 101 into the dolly 102, while maintaining a flat dolly deck surface. Pivotally attached to the dolly chassis 104 are chassis legs (FIG. 2), described herein as the front left leg 108; the front right leg 110; the rear right leg 112; and the rear left leg 114. As shown in FIG. 2 the rear legs 112 and 114 can be pivoted on the dolly chassis 104 into leg positions A, B, and C. Similarly, the front legs 108 and 110 may be pivoted into leg positions D, E and F. Other leg positions may also be used.

With the rear dolly legs in position B and the front dolly legs in position D, the dolly is in the straight ahead or narrowest width dolly configuration. With the rear dolly legs in position C and the front dolly legs in position E, the dolly is in the track position, i.e., the dolly is configured to roll on standard track having 24.56 centers i.e., the centerlines of the two rails of the standard track are spaced apart by 24.56. With the rear dolly legs in position A and the front dolly legs in position F, the dolly is in a simulated three-point suspension configuration, i.e., the camera dolly approximates a tripod suspension.

Figure 3:
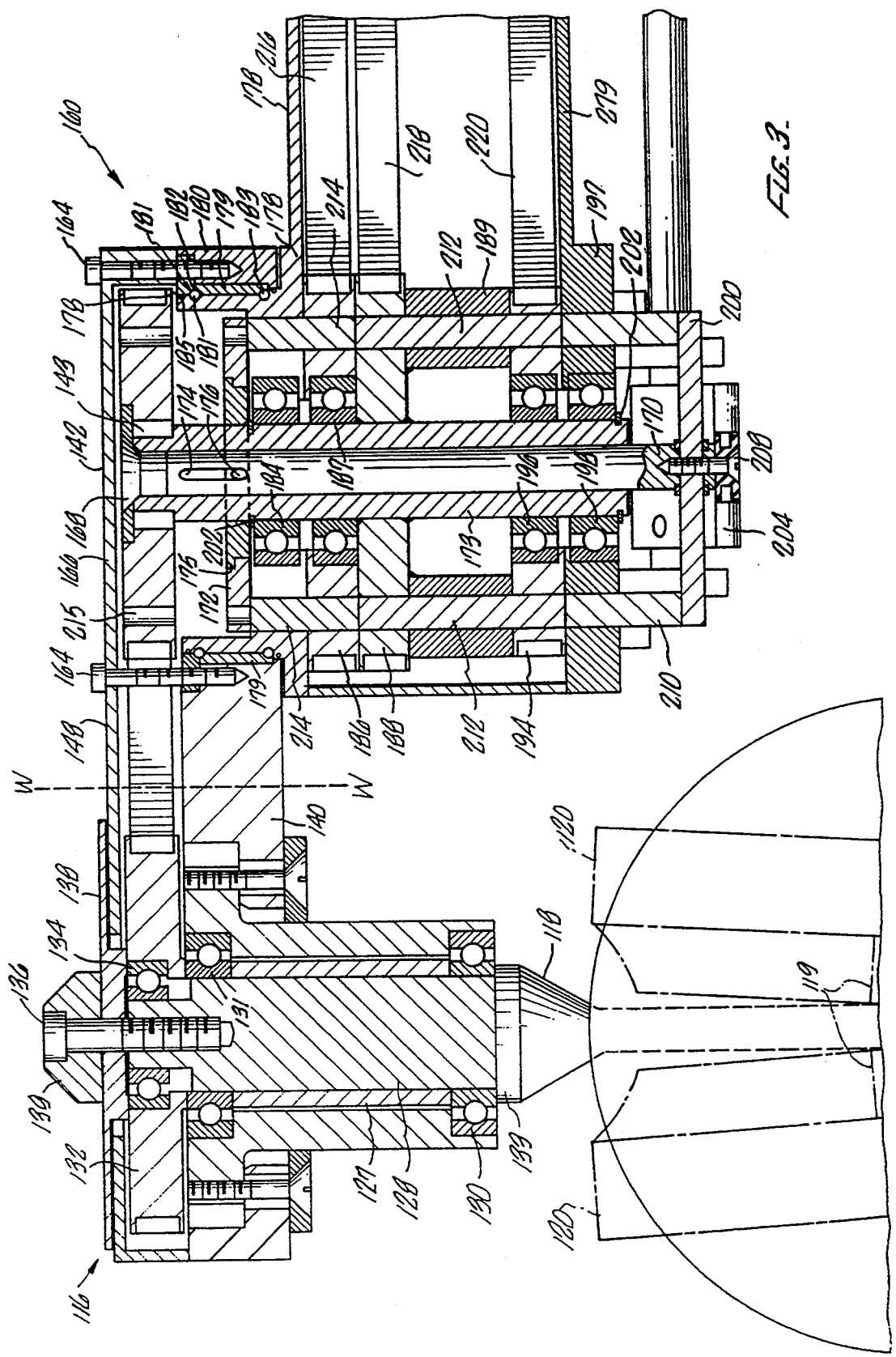
FIG. 3 is a section view fragment of the rear left leg and chassis section of the dolly of FIG. 1 illustrating the present crab-conventional steering shift apparatus.
Figure 5:
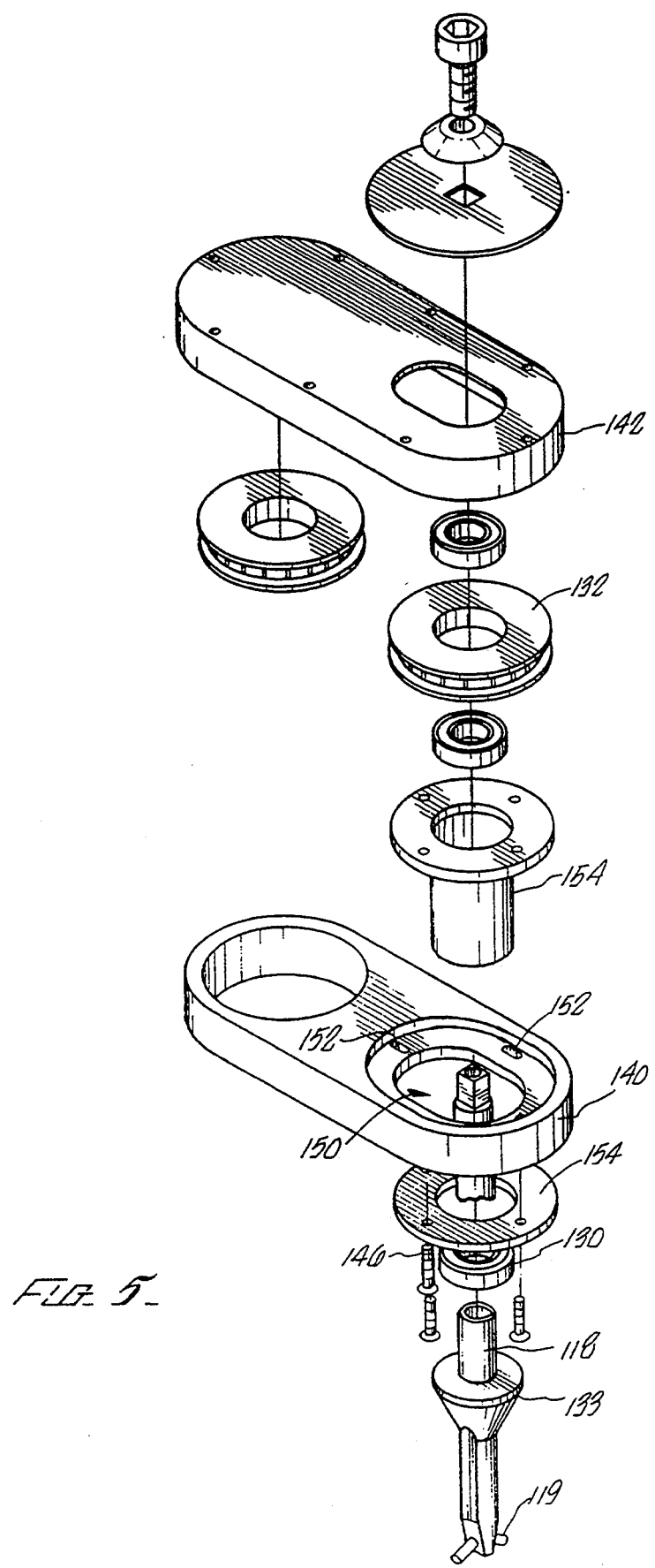
FIG. 5 is an exploded perspective view of a leg of the camera dolly of FIG. 1 illustrating the present adjustable leg belt tensioning apparatus and kingpin.

Referring to FIG. 3, the left rear-wheel king pin assembly 116 is described herein in detail. It will be understood, however, that the other wheel assemblies on the dolly 102 will have similar construction. (The wheel king pin assembly 116 generally comprises the structure to the left of line W—W in FIG. 3). A king pin 118 includes axles 119 extending at a dihedral angle. Wheels 120 are rotatably mounted on the axles 119. The wheels 120 are configured to roll either on the ground 122 or on a standard industry track rail. A king pin shaft 128 extends through a king pin shaft bearing 130 supported by a king pin ferrule 133. A spacer sleeve 127 spaces apart bearings 130 and 131 separating the bearings slightly more than the housing shoulder dimensions. A king pin sprocket 132 is mounted over a king pin sprocket bearing 134 on the king pin shaft 128. A wheel assembly steering locking bolt 136, preferably a socket head cap screw, extends through a cover plate 138 into a threaded hole in the top end of the king pin shaft 128. Cap 139 bears upon the cover plate 138 held by the locking bolt 136. As shown in FIG. 5, orientation of the plate 138 and its rotation is determined by the square end of the shaft 128 and the corresponding square hole in the plate 138. When the locking bolt 136 is tightened into the king pin shaft 128 the cap 139 causes the cover plate 138 and king pin sprocket 132 to lock against and rotate with the king pin shaft 128. Locking bolt 136 is loosened to align the wheel assembly and then retightened.

Specifically, to align the wheel assembly, the wheels are steered to a straight ahead position. The cover plate 138 has three grooves or markings corresponding to the three leg settings. With the locking bolt 136 loosened, the king pin 118 is turned to align the appropriate marking on the cover plate 138 with a reference mark on the upper leg frame 142. The locking bolt 136 is then retightened.

Each leg 108, 110, 112 and 114 comprises a lower leg frame 140 and an upper leg frame 142. As shown in FIG. 5, the lower leg frame 140 has an elongated or oval opening 150 and slotted holes 152 for securing the king pin armature 154 to the lower leg frame 140. The slotted holes 152 allow the king pin armature 154 to be slidably positioned to adjust the appropriate tension in the leg belt 148. The king pin ferrule 133 is clamped into position using clamping bolts 146 after the position of the king pin ferrule 133 has been adjusted for proper tensioning of the leg belts, e.g. belt 148. Spacer sleeve 127 is of correct length to prevent the alignment clamping forces to be placed on the bearing balls thus preventing added friction.

As shown in FIG. 3, in a left shift assembly 160, the upper leg frame 142 is secured to an outer bearing frame 180 by bolts 164 internally lined with a hardened sleeve 179. Within the left steering shift assembly 160 is a leg drive sprocket 166 linked by belt 148 to the king pin sprocket 132 (See FIG. 2 also). A cap screw 168 secures the leg drive sprocket 166 to a tubular axle 173 extending substantially vertically throughout the steering shift assembly 160. Dowel pins 143 finalize the attachment. An upper plate 172 is vertically slidable by way of a slot 174 on the shaft 170 by a pin 176.

A hardened inner bearing frame 178 pivotally supports the leg 114 (and legs 108, 110, and 112) on the dolly chassis 104. The outer bearing frame 180 with the hardened sleeve 179 is fitted over the inner bearing frame 178 to form the bearing to pivotally mount the legs 114. Balls 182 are positioned within upper and lower annular openings 181 and 183 formed by the inner bearing frames 178 and the hardened sleeve 179 on the outer bearing frame 180.

Since the outer bearing frame 180 is a structural member of the dolly, the shift assembly 160 can be made lightweight and compact. Seals 185 maintain lubricant within the bearings and keep contaminants out.

Referring still to FIG. 3, a conventional steering sprocket 186 is rotatably mounted on the axle 173 by a bearing 187. Similarly, a crab sprocket 194 is rotatably mounted on the axle 173 by crab sprocket bearings 196. A shaft drive sprocket 188 is irrotatably mounted on and fixed to the axle 173. A drive sleeve 189 is welded to the drive sprocket 188 to the crab sprocket 194, or the sleeve 189 and sprockets 188 and 194 can be a single piece unit. Plate bearings 184 and 198 support the axle 173 within the inner bearing frame 178 and lower support plate 197. Retaining rings 202 secure the axle 173 vertically within the shift assembly 160 on the inner races of bearings 198 and 184. A lower plate 200 is secured to the lower end of the shaft 170 by cap screw 208. Lower shift pins 210 resting against the lower plate 200 extend through the lower support 197 and butt against middle shift pins 212 which extend through holes in the crab steering sprocket 194 and drive sprocket 188. Upper shift pins 214 rest against the middle shift pins 212 and extend through the conventional steering drive sprocket 186. The upper ends of the upper shift pins 214 are secured to the upper plate 172 which can rotate on a disc 175 that is secured to axle 173 by a pin 176. The shift pins 210, 212 and 214 preferably have tapered ends so that they can drive into and align the sprockets even when the holes in the sprockets are not yet perfectly aligned. This provides a larger "shifting window" in time, for shifting steering modes. As shown in FIG. 3, 2 sets of shift pins are provided 180° apart.

A pivoting fork shift assembly 204 allows the lower plate 200 to be shifted from a lower or crab steering position (as shown in FIG. 3) wherein the middle shift pins 212 cause the drive sprocket 188 to be mechanically linked to the crab steering sprocket 194—to implement crab steering; to a second or conventional steering position wherein the lower plate 200 is shifted upwardly such that the crab sprocket 194 is mechanically linked to the fixed lower support 197 by the lower shift pins 210, and wherein the middle shift pins 212 cause the drive sprocket 188 to link up with and rotate with the conventional steering sprocket 186—to implement conventional steering (The term "conventional steering" as used herein means the steering mode where the front wheels of the dolly remain fixed straight ahead and the rear wheels turn for steering. Thus, with the shift assembly 160 shifted into the crab steering mode, the drive sprocket 188 turns with the crab sprocket 194, while the conventional steering sprocket 186 remains fixed. On the other hand, with the shift assembly 160 shifted into the conventional steering mode, the crab sprocket 194 remains fixed while the conventional steering sprocket 186 rotates with and is driven by the drive sprocket 188. Poke holes 215 through sprocket 166 and plate 172 allow the shift pins to be pushed out of the shift assembly 160 during maintenance.

Figure 6:
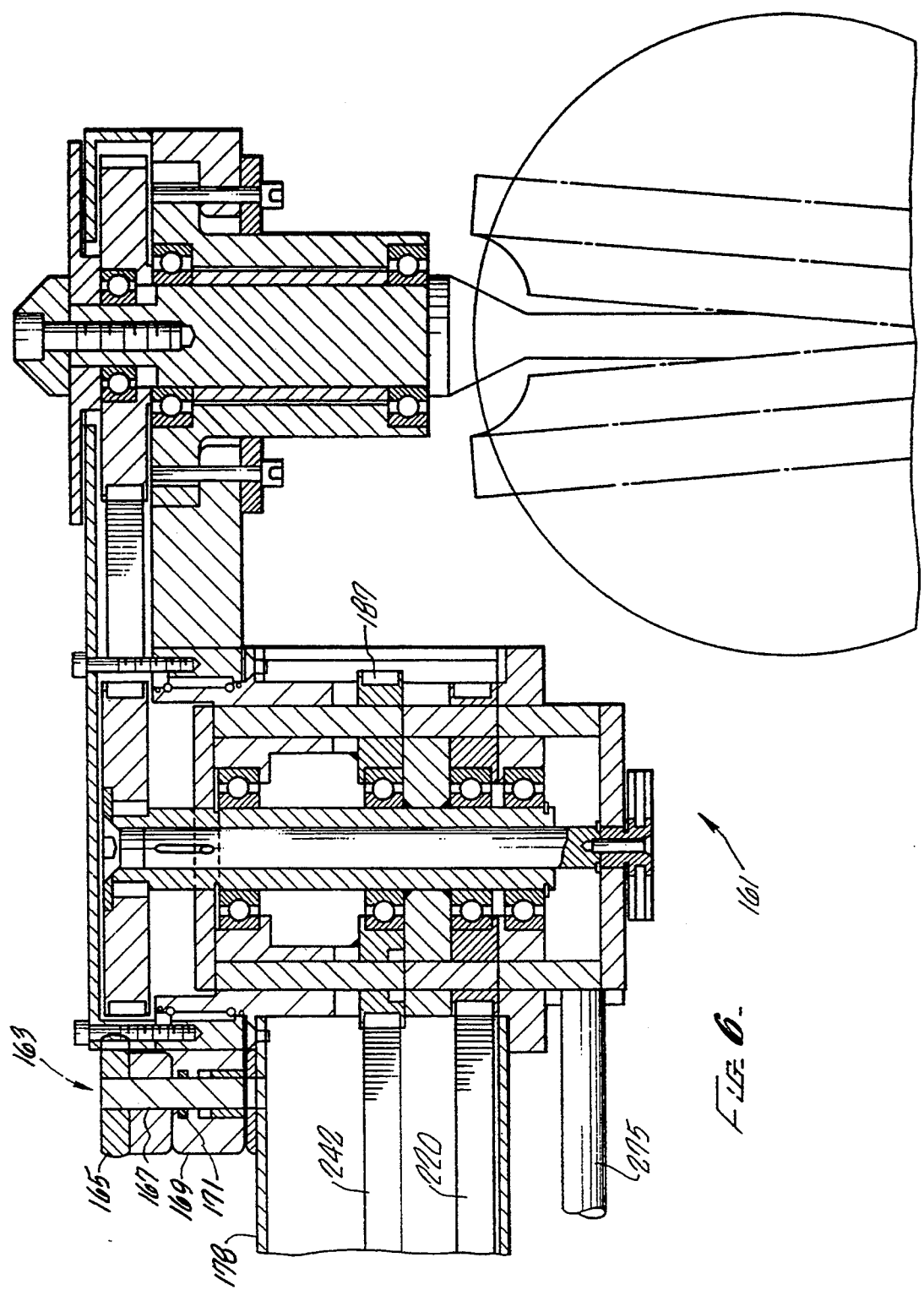
FIG. 6 is a section view fragment of the right rear leg and chassis of the dolly of FIG. 1.

As shown in FIG. 6, a second or right side steering shift assembly 161 is provided at the right rear of the dolly 102. However, this shift assembly 161, although similar to shift assembly 160, does not include a shaft drive sprocket 188.

The front legs 108 and 110 do not include or require any steering shift mechanism or a conventional steering drive sprocket, since the front wheels of the dolly are either in a fixed "straight ahead" position or are engaged in the crab steering mode. The front wheels of the dolly do not require or perform conventional steering correction as do the rear wheels.

Figure 4:
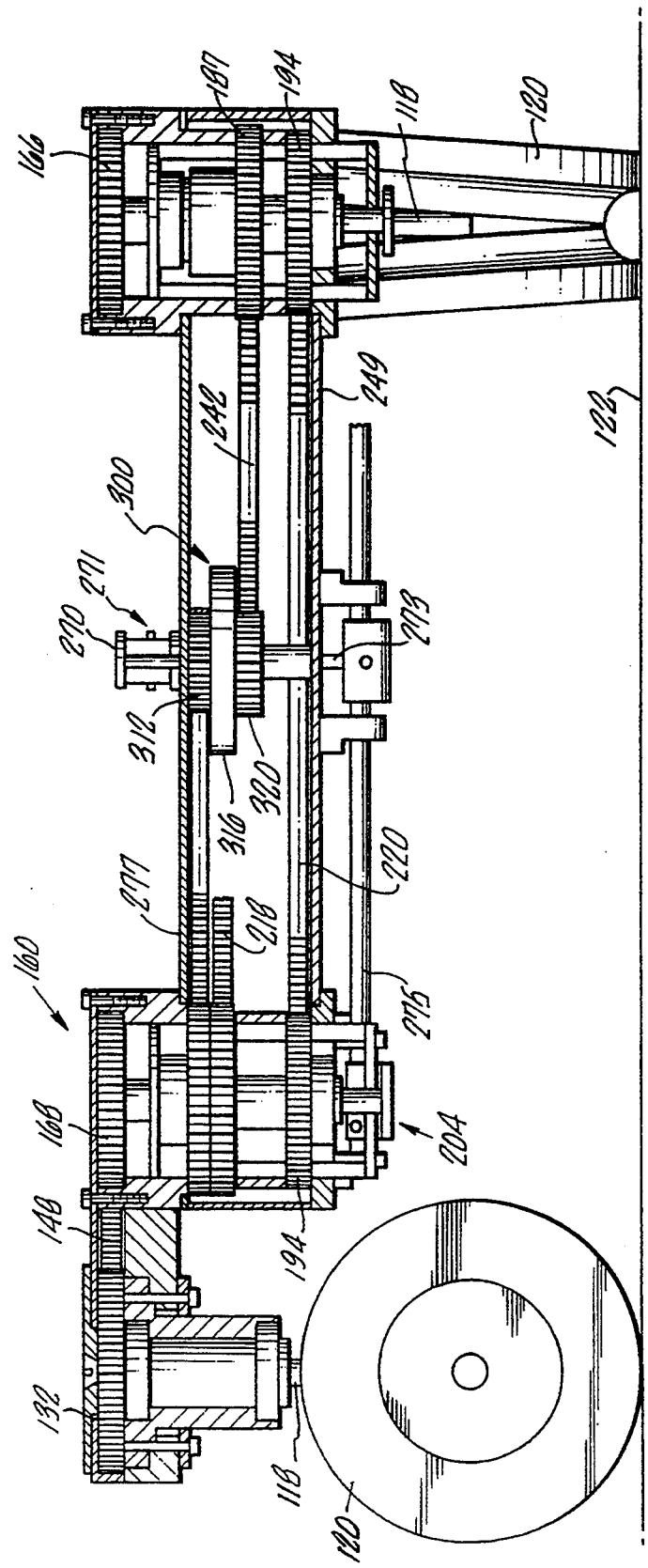
FIG. 4 is a partial section view of the back end of the dolly of FIG. 2 further illustrating the shift apparatus and steering drive system.

Referring to FIGS. 3 and 4, the dolly 102 can be shifted from conventional steering to crab steering and vice versa by actuation of a shift rocker 272 having knobs 270 and 271. With the shift knob 270 in the "up" position as shown in FIG. 4, the lower plate 200 in both the left and right shift assemblies 160 and 161 are in the lower or crab position such that the conventional steering sprockets 186 and 187 are deactivated and the crab sprockets 194 and 195 are driven by the steering system 201. With the shift knob 271 in the "up" position, the plates 200 in the shift assemblies 160 and 161 are displaced upwardly such that the crab sprockets 194 and 195 are deactivated and the conventional steering sprockets 186 and 187 come into play.

As shown in FIG. 4, the conventional shift knob 270 and the crab shift knob 271 are on the rocker 272 linked to an extension shaft 273 extending through the dolly chassis to an arm linkage joined to a pivot shaft 275. The ends of the pivot shaft 275 are attached to a fork assembly 204 at the left end right shift assemblies 160 and 161. The fork assemblies 204 are pivotally joined to the (vertical) shafts 170 in the shift assemblies 160 and 161. Consequently angular rotation of the shaft 275 causes the vertical shafts 170 to shift between conventional and crab steering modes. As shown in FIG. 2, the shaft 275 is positioned between the crab and conventional steering knobs 271 and 270. As one knob is depressed, the other is raised on the rocker 272 fixed to the top deck, as the dolly is shifted between conventional and crab modes. The rocker is preferably operated by foot.

Thus, the steering shift assembly 160 and 161 allows the dolly 102 to be shifted from conventional steering, i.e., wherein the front wheels of the dolly would remain fixed in a "straight ahead" position with the rear wheels performing the steering, to a crab steering mode wherein all wheels remain parallel to each other and in the same direction, such that the dolly can "crab".

Figure 7:
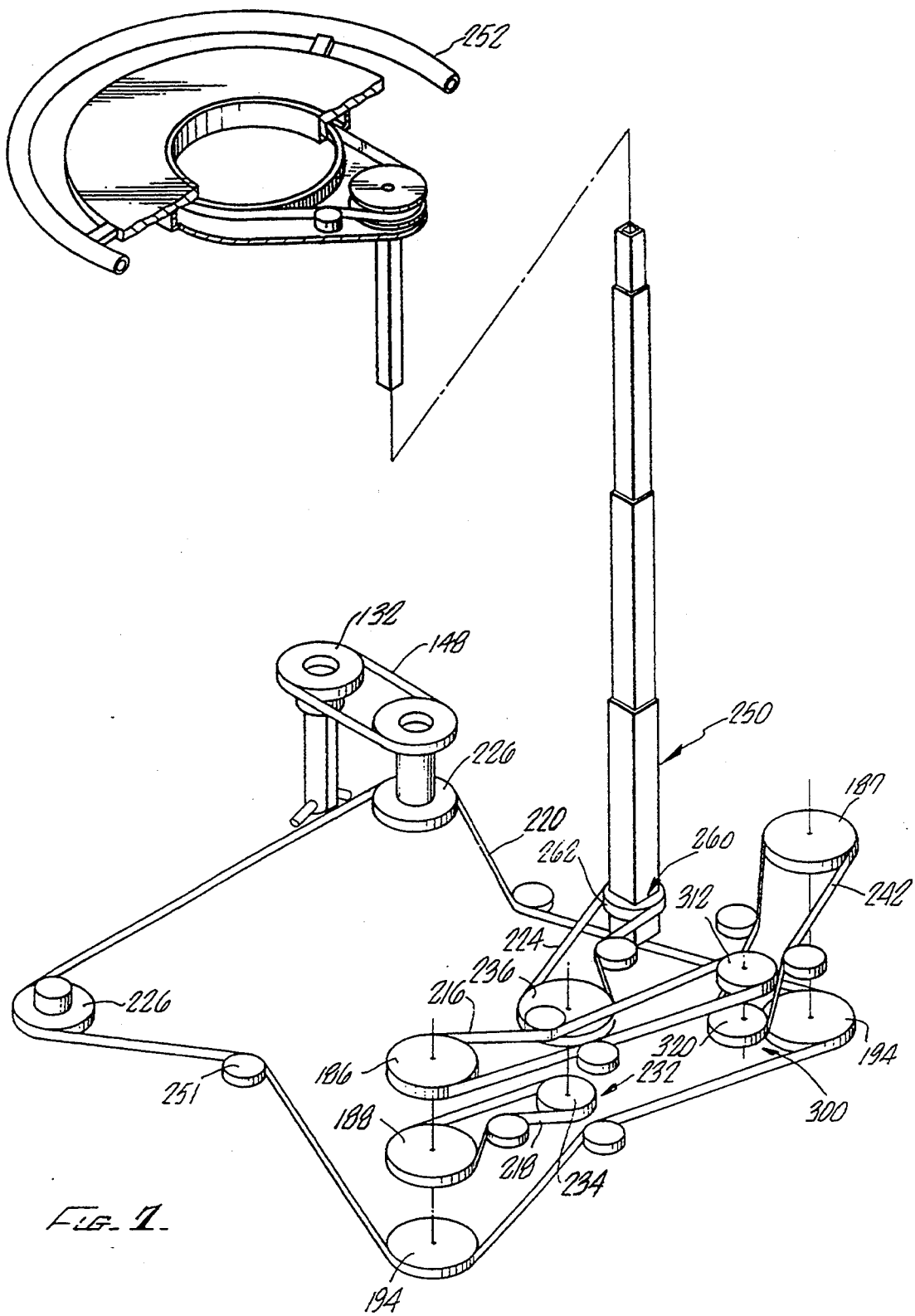
FIG. 7 is a schematic illustration of the steering system of the camera dolly of FIG. 1 linked to a steering assembly of a camera pedestal.

FIGS. 2 and 7 illustrate the steering system 201 of the dolly unit 102. As shown therein, the crab belt 220 continuously loops around and drivingly engages the crab sprockets 194 and front chassis sprockets 226, all of which are contained within the dolly chassis 104. The front chassis sprockets 226 are fixed to a shaft which drives the drive sprockets 106 in the front legs 108 and 110. Idler pulleys 251 are provided along the sides of the chassis for tensioning the crab belt 220. All of the belts in the steering system 201 are toothed rubber belts and have a flat back surface, such as Gates Rubber Co. POLYCHAIN GT belts.

A primary sprocket 262 has a through square receptacle 260 adopted to receive a telescoping steering drive shaft 250 linked to the steering assembly of the pedestal, as described in U.S. Pat. No. 5,197,700. A first ratio belt 224 drivably connects the primary sprocket 262 to an outer or second sprocket 236 on a two stage idler 232. A first or inner sprocket 234 of the two stage idler 232 is linked by the drive belt 218 to the shaft drive sprocket 188, as shown in FIG. 3. The conventional steering sprocket 186 is connected by the left conventional steering belt 216 to a steering corrector unit 300, and specifically to a first sprocket 312 on the corrector 300. A second sprocket 320 on the corrector 300 is linked by a right side conventional steering belt 242 to a right side conventional steering sprocket 187 within a right side shift assembly 161, as shown in FIG. 6. Idler pulleys are provided as shown in FIG. 2 to provide proper belt tensioning and for alignment purposes during manufacture or maintenance.

The sprockets in the steering system are selected so that the wheels 120 of the dolly will move directly and with the same turning angle as the steering wheel 252 on the pedestal. These ratios can be achieved by using 8M22 sprockets for sprockets 262, 234, 312, and 320; 8M40 sprockets for sprockets 132, 166, 226 and 194; 8M44 sprockets for sprockets 186, 188 and 236 are also available from Gates Rubber Co. (the last 2 digits indicating the number of sprocket teeth). The initial drive reduction is 112÷28=4. The corresponding drive increase is (44÷22)(2)=4. The ratio between the steering wheel and the wheels, therefor, is 1 to 1. These sprockets can be machined down in height to maintain a compact and streamlined dolly chassis. Use of these sprockets with the Gates POLYCHAIN GT belts provides for exceptionally precise movement and handling of the steering system 201 which is very noticeable and desirable to the dolly grip or user. This steering system is also very quiet in operation permitting it to be freely used on sound stages without interfering with the audio aspects of television or motion picture production. Although the present embodiment uses toothed belts, chains, if made suitably quiet, could also be used.

Figure 11:
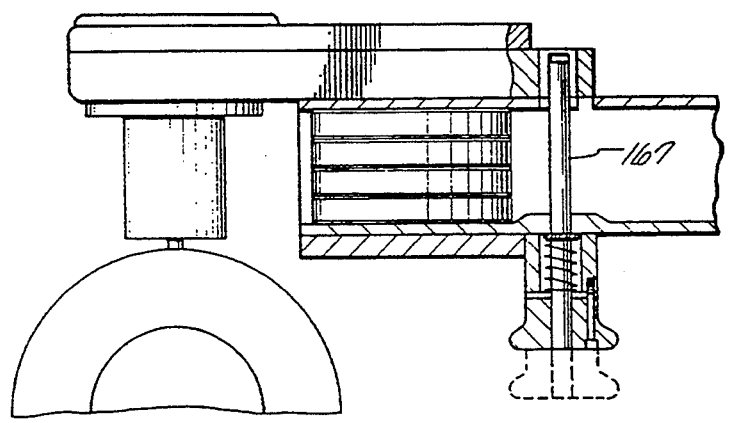
FIG. 11 is a side elevation view fragment in part section of the second embodiment of the leg locking system.

A leg locking pin system 163 is provided for each leg to lock the leg into its selected position. As shown in FIG. 6, a crescent shaped handle 165 is joined to a pin 167 in a pin frame 169. A bushing or O-ring 171 in the frame 169 surrounds the pin 167 and provides damping to its movement. The pin 167 is releasably engageable through a bore in a flange of the hardened innerbearing frame 178 overlying the dolly chassis. An alternative embodiment operated from underneath the dolly chassis is shown in FIG. 11.

Figure 8:
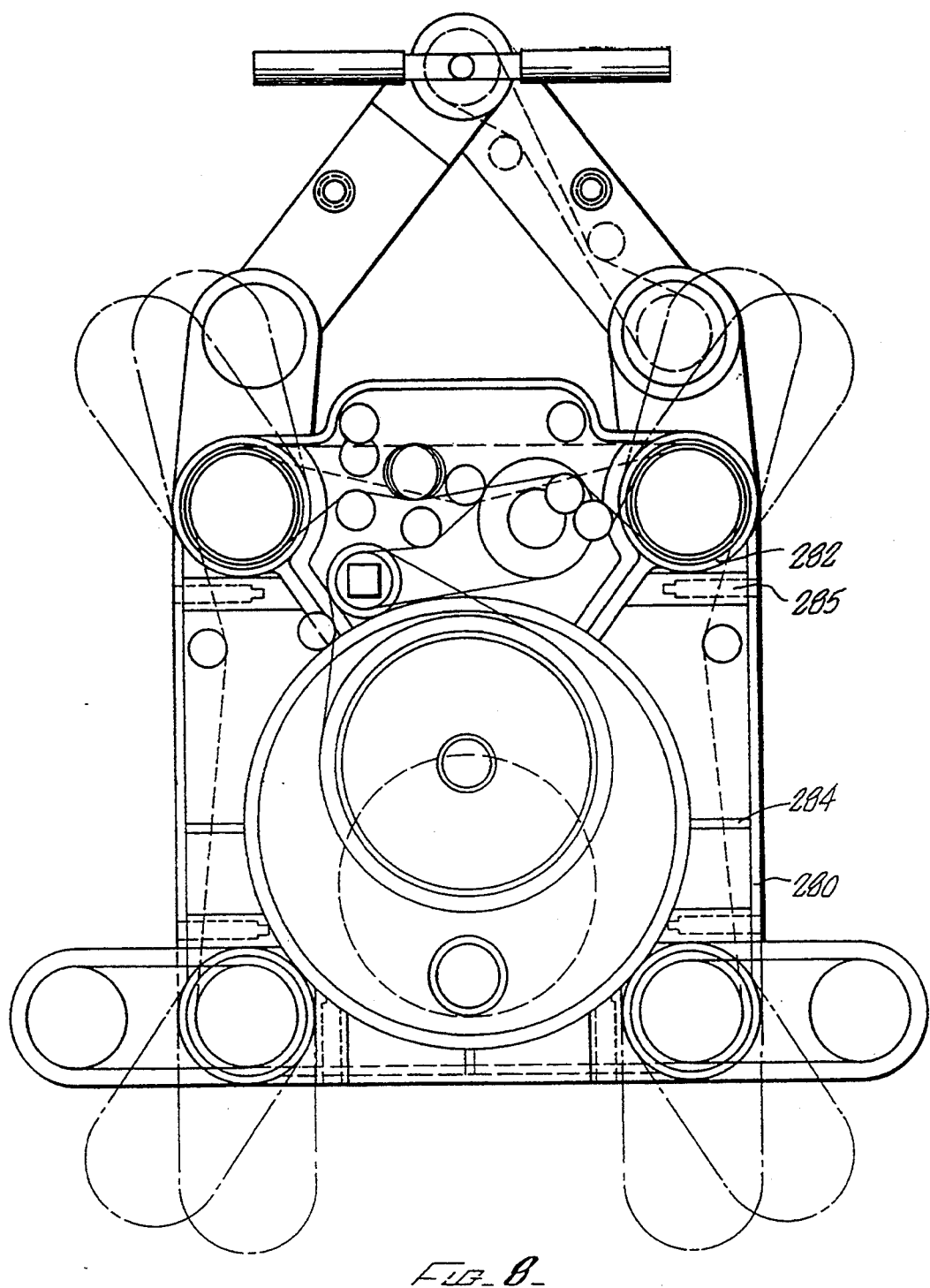
FIG. 8 is a schematic illustration of the dolly chassis with a steering bracket accessory installed.

As shown in FIGS. 3, 4, 7 and 8, the dolly chassis may be made as generally square or rectangular weldment with removable top and bottom plates 277 and 279 spaced apart by the frame 280, tubes 282, and ribs 284 (FIG. 8). Accessory pockets 285 are provided at the front and sides of the chassis to hold seats, platforms, pushbars, etc.

As is well known in the art, to achieve proper steering geometry with conventional steering, the rear wheels must be oriented so that their axes (i.e., a line perpendicular to the wheels and colinear with the axles) intersect at a point on a line passing through the centerlines of the front wheels. To the extent the rear wheels deviate from this geometry, rolling friction will be increased due to scrubbing of the wheels on the floor surface. This principle is illustrated schematically in FIG. 12B and Table 1 which shows steering angle correction for the dolly 102 when the legs 108, 110, 112, and 114 are in front and rear leg positions E-B and F-A as shown in FIG. 2. As shown in FIG. 12B, and Table 1 the steering correction required in conventional steering of the rear wheels ranges from 0.0 when the dolly 102 is steered to move in a straight line, to a maximum 107.10° for the right rear wheel when the dolly is steered to pivot around point P in FIG. 12B. The left and right rear wheels in FIG. 12B are designated by AA and BB. As shown, wheels B turn 72.9° to meet point P.

Figure 9:
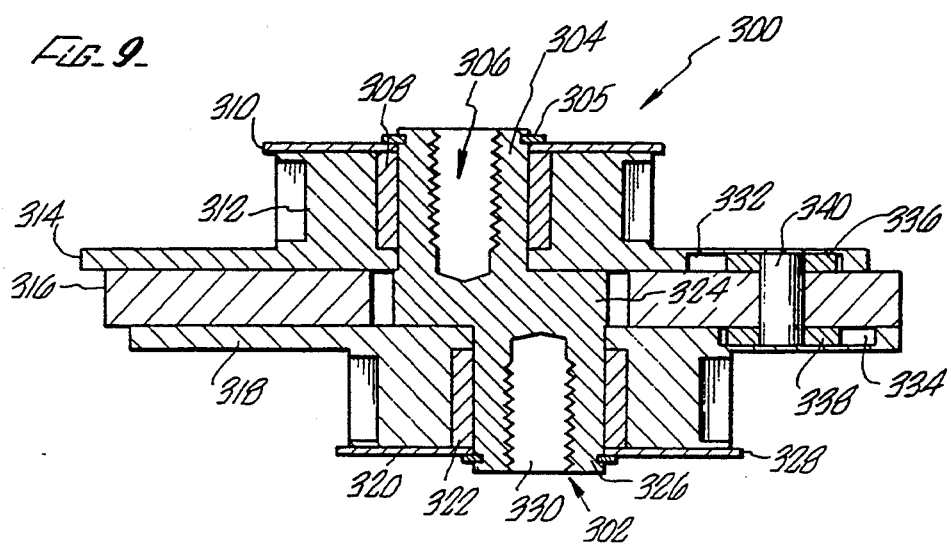
FIG. 9 is a section view of the present steering corrector of the camera dolly of FIG. 1.

A steering corrector or transmission unit 300 sets the proper relative angles of the rear wheels to achieve proper steering geometry. As shown in FIG. 9, the corrector unit 300 includes an eccentric hardened shaft 302 having an upper or first shaft section 304, a central section 324 and a lower or second shaft section 326 offset from the first shaft section 304. A threaded bore 306 extends into the first shaft section 304. Correspondingly, a threaded bore 330 extends into the second shaft section 326. A top sprocket 312 is rotatably mounted onto the first shaft section 304 through a needle bearing 308. A belt flange 310 is integral with the top sprocket 312 and the top sprocket is held onto the first shaft section 304 by a snap ring 305. A top plate section 314 is rigidly attached to or integral with the top sprocket 312. Similarly, a bottom sprocket 320, of the same size and pitch as the top sprocket 312 is rotatably mounted on the second shaft section 326 by a bearing 322. A belt flange 328 is integral with the bottom sprocket 320 which is held onto the second shaft section 326 by a snap ring 327. A lower plate 318 is rigidly attached to or integral with the bottom sprocket 320. A correction disk 316 is rotatably mounted on the central section 324 of the eccentric shaft 302 on a Glacier DU bushing or suitable alternate and between the upper plate 314 and lower plate 318.

The top plate 314 section includes a radial slot 332 containing an upper dog plate 336. Similarly, the lower 318 has a radial slot 334 containing a lower dog plate 338. A pin 340 connects the upper dog plate 336 to the lower dog plate 338 through a bore in the disk 316. An alignment hole 342 passes through the plates 314 and 318, and disk 316. During factory assembly, a pin placed in the hole 342 maintaining alignment within the corrector 300 while it is being installed. When in the shifting position the pin 340 must be at 90° to a plane passing through the centerline of shafts 304 and 326. (90° to the position shown in FIG. 9 or perpendicular to the plane of the paper).

When installed in the steering and drive system 201, the eccentric shaft 302 is fixed to the dolly chassis 104 by screw fasteners passing through the dolly chassis 104 into the threaded bores 306 and 330. As the dolly is steered in the conventional steering mode, belt 216 turns the top sprocket 312 on the shaft 302 as shown in FIGS. 2 and 9. The first sprocket 312 is linked to the second sprocket 320 through the interaction of the disk 316 and the interlinked sliding dogs 336 and 338. The geometry of the corrector 300 causes the second sprocket 320 to turn through a "corrected angle" with respect to the first sprocket 312. Correspondingly, the second sprocket 320 drives the right side conventional steering belt 242, thereby driving the sprockets in the right rear leg 112 and causing the right rear wheels to be steered to the proper conventional steering angle. The corrector 300 operates continuously, i.e., it sets very accurate corrected steering regardless of wheel position. If the steering wheel 252 is turned 180°, 360° or through any angle, the corrector 300 uniformly maintains the appropriate conventional steering angles. In addition, testing shows the correction provided by the corrector 300 to be so accurate (in the straight ahead leg configuration and 3-point configuration) that any "misalignment" of the rear wheels in conventional steering is so slight as to be beyond human perception.

Figure 10:
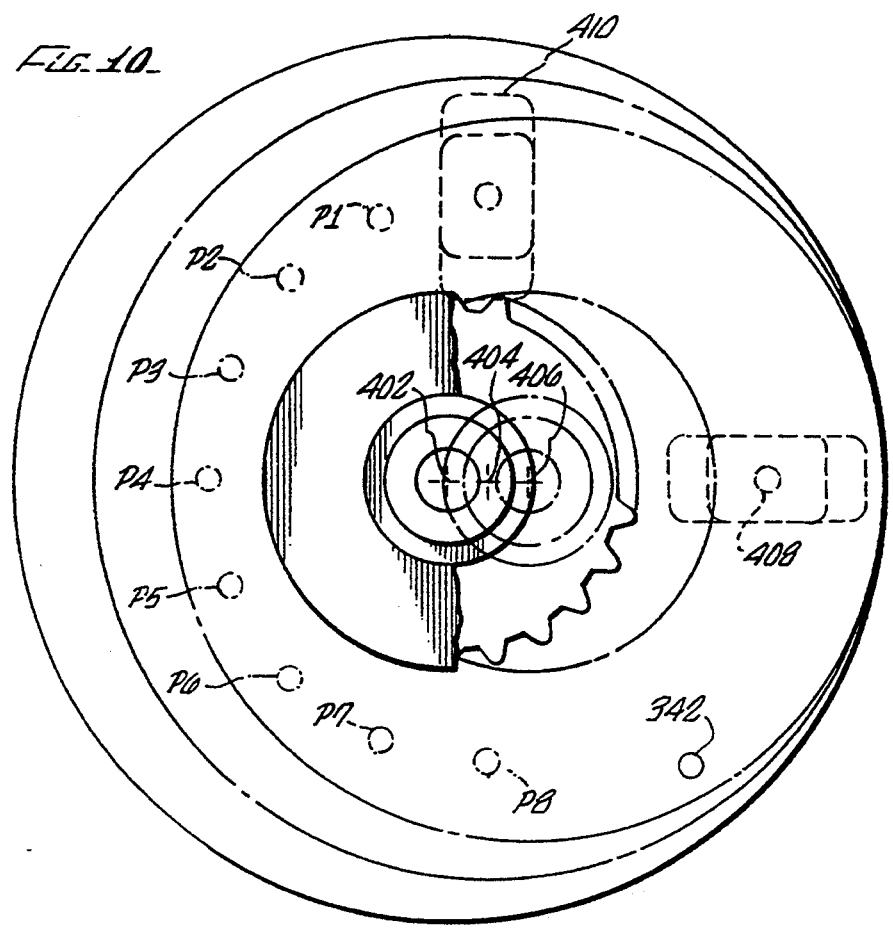
FIG. 10 is a top view thereof.

In FIG. 10, 402 represents the axis of the first section 304, 404 represents the axis of the central section 324, and 406 represents the axis of the third section 326 of the shaft 302. 408 is shown 90° to the alignment position. With the sprockets and disk oriented to the position 410 in FIG. 10, there is 0 correction, i.e. the wheels are straight ahead (the shifting position). Positions P1-P8 in FIG. 10 corresponds to the angular movements shown in FIG. 12A and 12B.

Figure 12A:
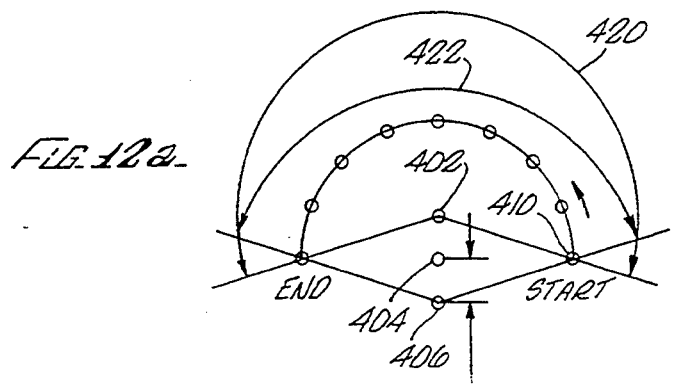
FIGS. 12A and 12B are geometric constructions of the steering correction provided by the corrector shown in FIG. 10.
Figure 12B:
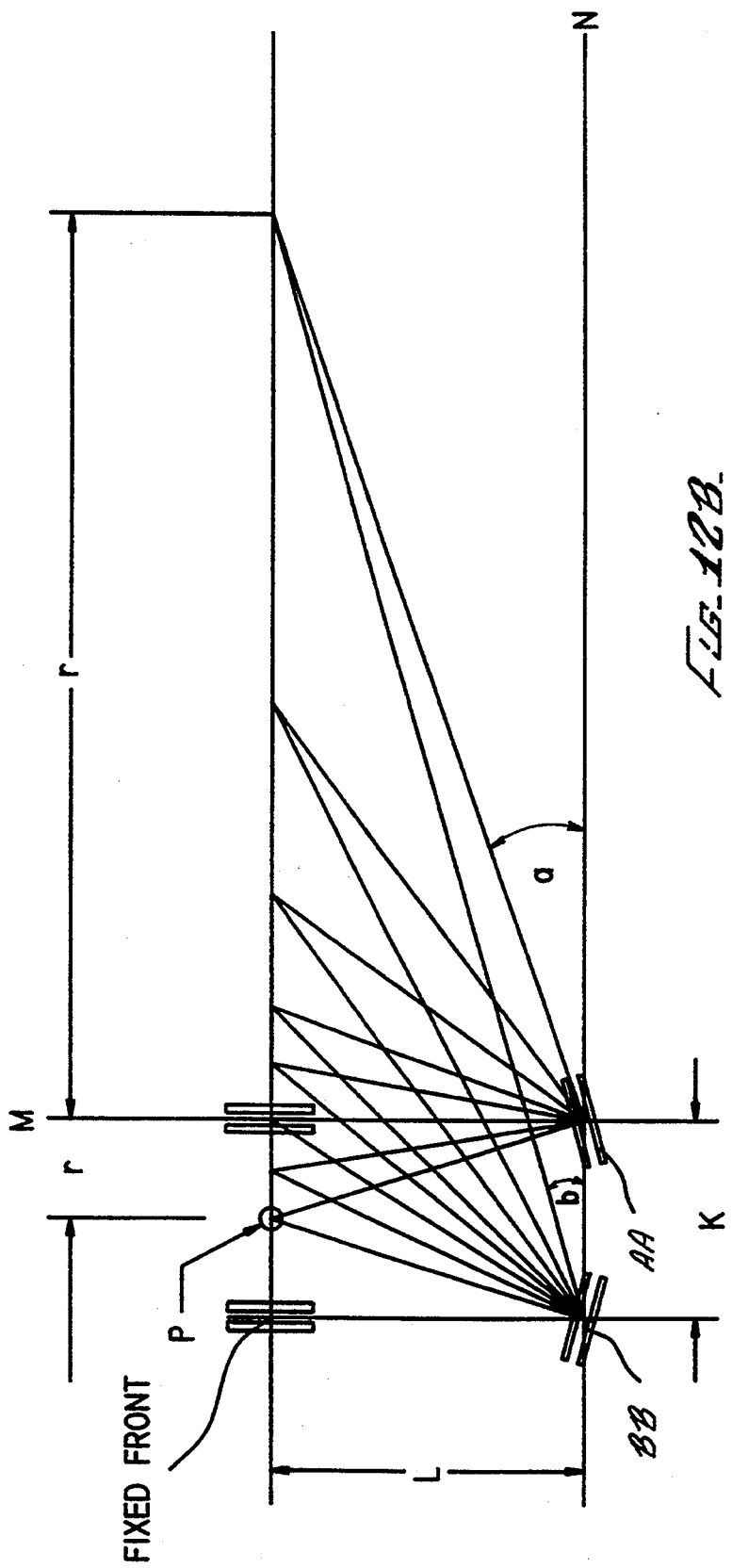

Referring to FIG. 12A, the correspondence of the centers of rotation 406, 404 and 402 are graphically represented. The arc 420 sweeps through 214.238°, i.e., this is the angle of rotation of the top sprocket 312 about its center of rotation 402, at maximum correction. This corresponds to a king pin angle of rotation of the wheels of 107.10°, due to the 2:1 ratio of the sprocket sizes between the corrected sprockets and the conventional steering sprockets 186 and 187. The lower sprocket 320 which rotates about axis 406, for the same movement, sweeps through arc 422 comprising an angle of 145.093°, again from start or 0 correction to maximum correction. This movement of the lower sprocket 320 turns the right rear wheels to an angle of 72.90°, again one half of the amount of rotation of the sprocket 320 due to the sprocket drive ratios. These numbers correspond to a corrector offset of 0.231 in. Other offset values can be selected for various wheel base combinations. FIG. 12B, in addition, shows the relationships of the intermediate wheel positions designated in FIGS. 10 and 12A. Of course, the corrector 300 operates continuously to correct steering regardless of the increments shown or steering angle. The angles selected in FIGS. 8 and 12A and 12B are examples selected for illustration purposes.

Figure 13:
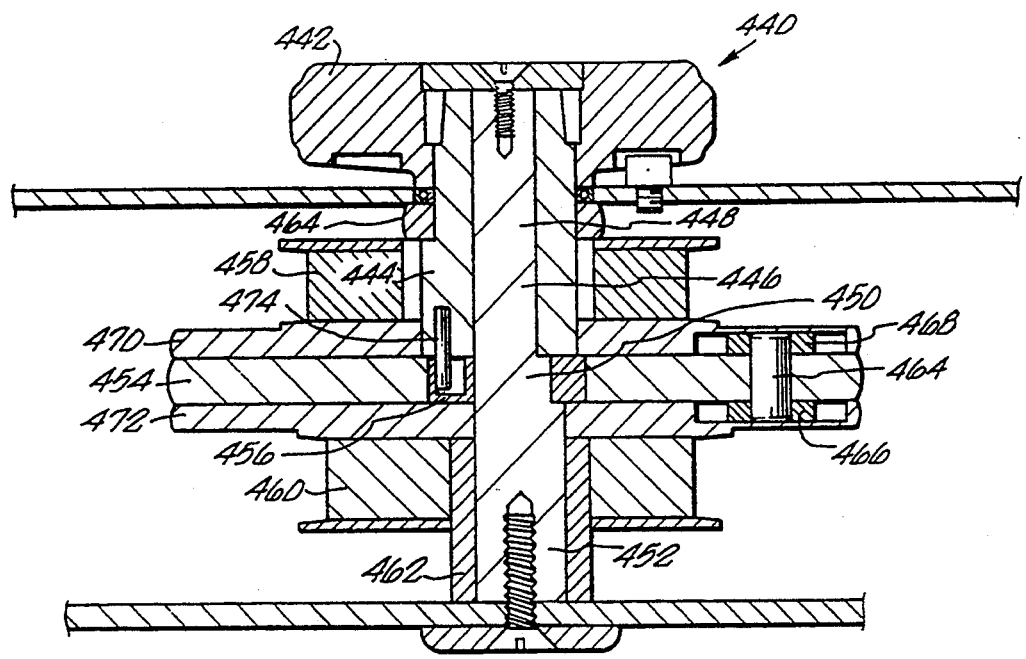
FIG. 13 is a section view of a second embodiment of the present steering corrector.

The corrector 300 shown in FIG. 9 does not provide exact correction for conventional steering when the legs are in the track position. Shown in FIG. 13 is an alternative embodiment of the corrector 300 which is adjustable to provide proper steering correction for all leg configurations. Referring to FIG. 13, an adjustable steering corrector 440 has a knob 442 on top of the dolly chassis. A shaft 446 has a first section 448, a central section 450 and a second section 452 offset from the central and first shaft sections. An eccentric drive collar 444 is rotatably mounted on the first shaft section 448. A central plate 454 is fixed to a floating hub 456 which is rotatably mounted onto the central shaft section 450. A top sprocket 458 is rotatably positioned over the eccentric drive collar 444. A bottom sprocket 460 is rotatably mounted on the lower shaft section 452. Upper and lower spacers 464 and 462 secure the corrector 440 within the dolly chassis. A pin 464 interconnects sliding dogs 466 and 468 which are radially slidable in slots in the plate sections 470 and 472 of the upper and lower sprockets 458 and 460. A collar pin 474 extends from the eccentric drive collar 444 into the floating hub 456. By turning the knob 442, the amount of offset between the axis of rotation of the sprockets 458 and 460 is changed from an amount suitable for correcting steering in the 3-point simulation and straight ahead positions, to correcting steering for the track position. Accordingly, proper steering correction can be implemented in any of the three dolly leg configurations by turning the knob 442 on the corrector 440 to select the appropriate selection mode of the corrector 440.

Figure 15:
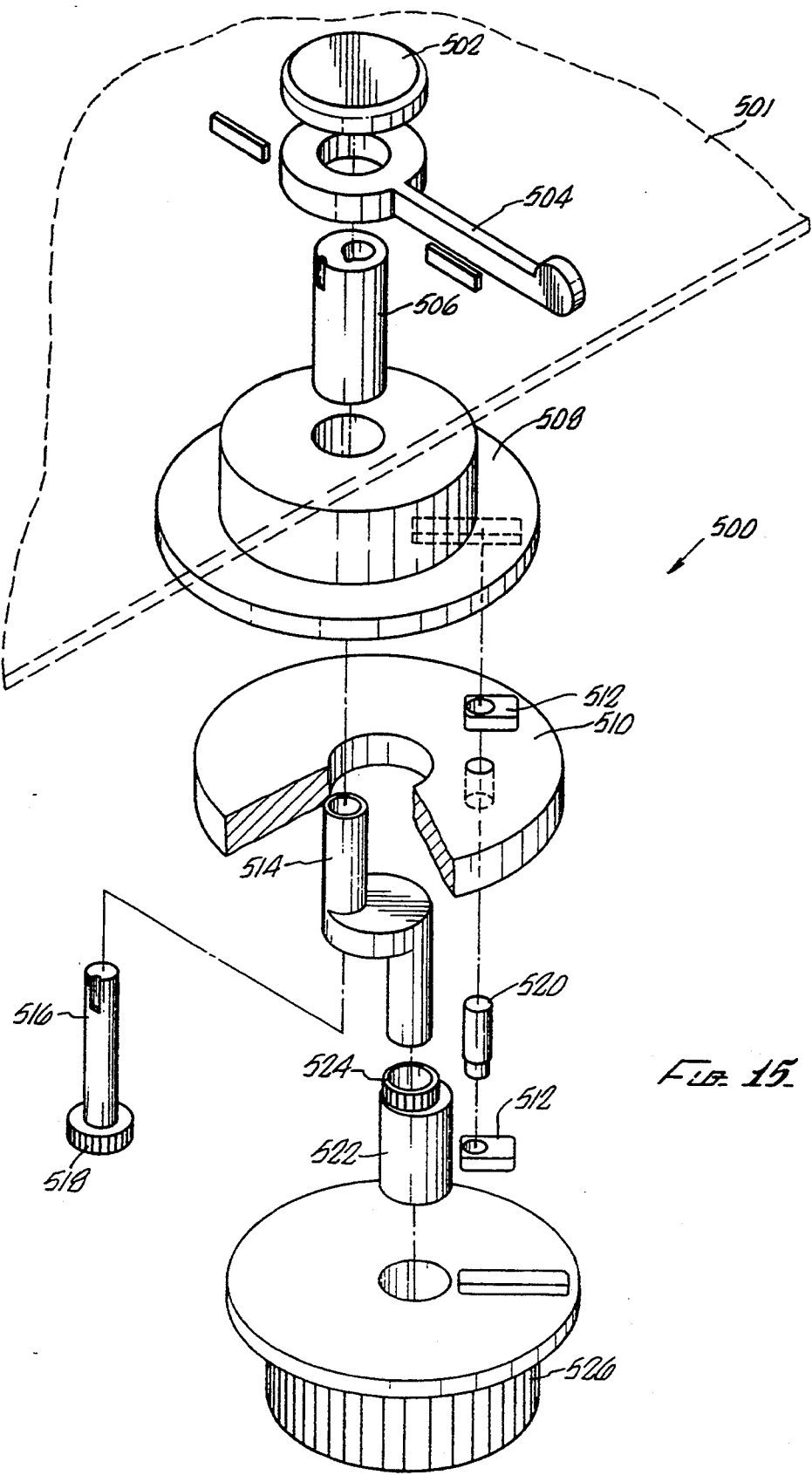
FIG. 15 is an exploded perspective view of the corrector of FIG. 14.

Another adjustable steering corrector 500 is shown in FIGS. 14 and 15. The top cap 502 and hand lever 504 of the steering corrector 500 are above the top deck 501 of the dolly chassis. The hand lever 504 is pinned to a top cam 506 which passes through a top sprocket 508 on a hub 514. A gear post 516 having a spur gear 518 at its lower end passes through the hollow hub 514 and is attached to and turns with the lever 504 and top cam 506. A bottom cam 522 has a spur gear 524 attached at its upper end. The bottom cam 522 is positioned within a lower sprocket 526 on the hub 514. The steering corrector 500 has a disc 510 and sliding dogs 512 connected by a pin 520, similar to the correctors shown in FIGS. 9 and 13. The principle of operation of the corrector 500 is also similar to the operation of the correctors shown in FIGS. 9 and 13. However, in contrast to the adjustable corrector 440 shown in FIG. 13, the corrector 500 shown in FIGS. 14 and 15, by virtue of the cam and spur gear arrangement, achieves twice the offset since movement of the hand lever 504 causes both the top sprocket 508 and the lower sprocket 526 to move apart. This provides for a wider range of steering correction geometry within a compact size. In the preferred embodiment, this version corrects the offsets from 0.204 in. to 0.310 in. (axle centerline separation is 0.408 in to 0.620 in.)

FIG. 16 shows a steering corrector 530 identical to the steering corrector 500 in FIG. 14, except for the design and mounting of the lower end. As shown in FIG. 16, steering corrector 530 has an extended bottom cam 532 and extended hub 534, with the extended bottom cam 532 secured within a bearing 536. The bearing 536 is rigidly mounted within the dolly chassis. As the lever 504 on the steering corrector 530 is shifted, there is no shifting of the lower sprocket 526. All movement due to the cam action occurs at the upper end of the transmission 530. The chassis top deck surrounding the transmission 530 is slotted (0.212 in. in the preferred design). A bushing having a square outside shape is provided around the transmission 530 to guide the upper end of the transmission in the slotted chassis deck.

As shown in FIGS. 1–4 and 28, the camera dolly 102 has steerable front wheels 120A and back wheels 120B. In FIG. 2, all four sets of wheels (and the legs as well as drawn in solid lines) are in the "straight ahead" position corresponding to wheel angles of 0° or 180°.

In the conventional steering mode, the front wheels 120A are secured in a straight ahead (0° or 180°) position, while the back wheels 120B are steered with the steering wheel 252. In crab steering mode, both the front wheels and back wheels are steered at the same angle, such that the camera support dolly can be steered and pushed laterally to the side, front or back, or at any desired angle, without changing the orientation of the camera 50.

Referring to FIG. 17, to use the crab and conventional steering shift rocker 272, the dolly operator or grip must physically depress either pedal with a hand or foot. When the steering system 201 of the camera dolly is to be shifted between crab and conventional steering, while the dolly is moving during a filming sequence, it can be difficult for the grip to actuate either steering shift pedal while simultaneously smoothly pushing or keeping up with the moving camera dolly. In addition, the steering system 201 can only be shifted between crab and conventional steering when the front and rear wheels are in the straight ahead (0° or 180°) position. This makes the dolly grip's objective of smoothly shifting the moving dolly between steering modes more difficult.

The front sets of wheels will always be properly aligned for shifting since in crab mode their steering angle always matches that of the rear wheels. Thus, when the rear wheels are straight ahead, the front wheels will also be positioned straight ahead. In conventional steering mode, the front wheels are always aligned straight ahead.

Figure 27:
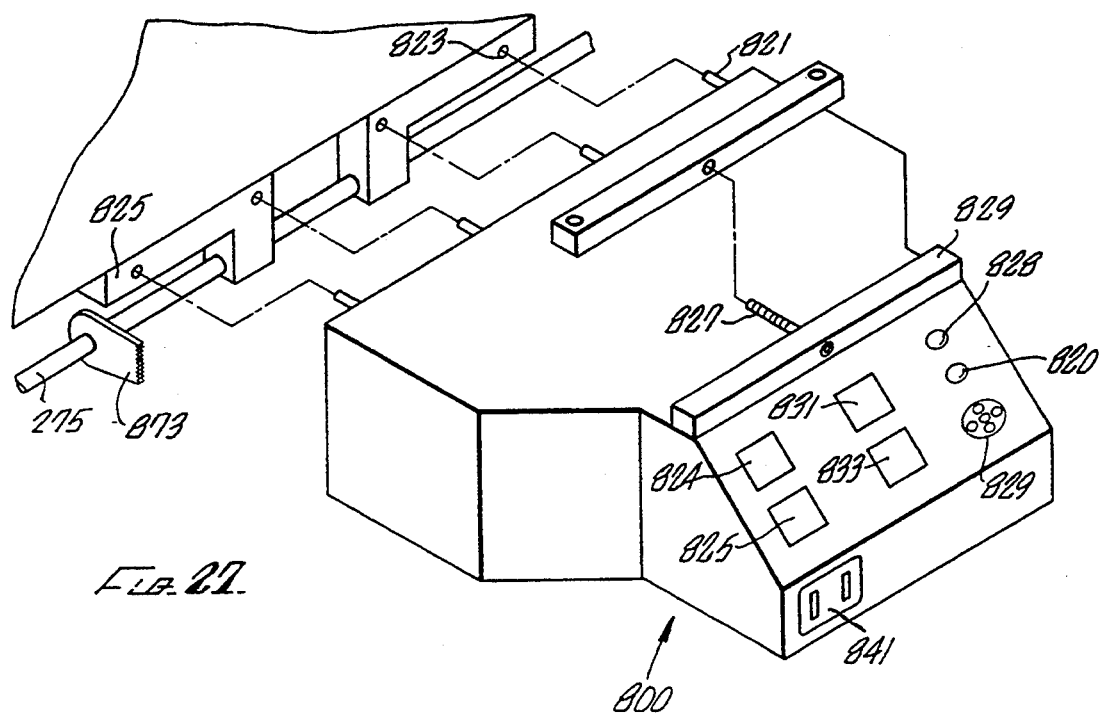
FIG. 27 is a perspective view showing the installation of the electronic shifter onto the camera dolly.
Figure 28:
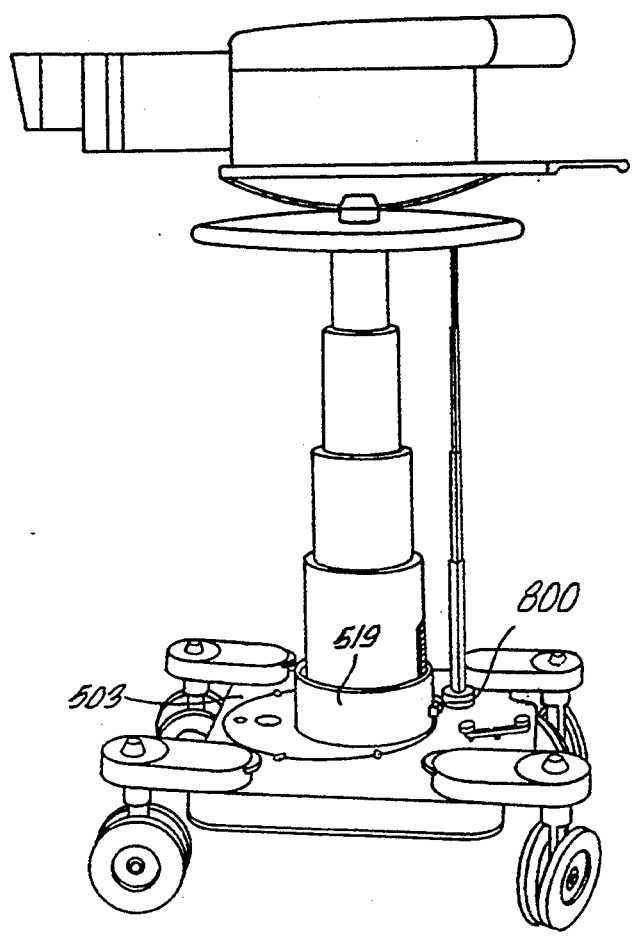
FIG. 28 is a perspective view of the camera dolly with the column fully extended.

As shown in FIGS. 17 and 27, an electronic shifter 800 is provided preferably as an accessory attached to the underside 802 of the camera dolly, to automatically shift the steering system 201 of the camera dolly between conventional and crab steering modes without hand or foot actuation of the shift knobs or pedals.

Referring to FIGS. 18 and 19, to detect when the rear camera dolly wheels are in the 0° or 180° position, (i.e., in a shiftable position) a shiftable position angle detector system 804 is provided. A notch plate 806 having notches 807 on opposite sides thereof is secured at the bottom of the rear left tubular axle 173. The bearing support or housing 197 as shown in FIG. 3 supports the axle 173 and related components in position. A switch 808 having a roller 810 at the end of an arm 812 is attached to the stationary housing 197. The roller 810 rolls on the outer circumference of the notch plate 806. The notch plate turns as the wheels are steered through the steering system. The switch 808 is linked through a cable 809 and connector 810 to a connector receptacle 812 in the shifter 800.

Only the rear left wheel position need be monitored for a shiftable position (0° or 180°) because when the rear left wheel is at 0° or 180°, due to the design of the steering system 201, the rear right wheel (or pair of wheels) will necessarily also be in a like position.

Referring to FIGS. 20 and 21, the electronic shifter 800 has a removable cover 815 held to a housing 814 with screws 816. As shown in FIGS. 17 and 27, the shifter is mounted underneath the camera dolly with the cover 815 facing the floor or ground surface 122. Mounting pins 821 extending from the back of the housing 814 slide into and engage mounting holes 823 in bearing blocks 825 attached to the dolly lower surface 402. A single attachment bolt 827 engages a mounting block 829 adjacent the back edge of the dolly lower surface 802. Thus the shifter can be installed onto the dolly with a single bolt 827 without lifting or tilting the dolly. Alternatively, a thumbscrew, wingbolt or other hand fastener can be used so that the shifter 800 can be installed without using any tool.

Referring still to FIGS. 20 and 27, the shifter 800 has an angular up-facing front panel 820 having a crab steering mode selection switch 824, and a conventional steering mode selection switch 825. Indicator lights 831 and 833 alongside the crab and conventional steering mode selection switches 824 and 825 indicate the steering mode into which the steering system has been switched. The panel face is inclined upwardly at an angle to allow the dolly operator to easily view the panel while operating the dolly. The panel 820 also has a battery charging indicator light 828 and a connector 829. A remote hand control 830 (FIG. 20) has a steering mode selector switch 826 and indicator lights 832 and 833, similar to indicator lights 826 and 827. A cable 834 connects the remote hand control 830 to the shifter 800 through a connector plug 835 which engages connector 829 on the switch panel.

An alternate embodiment of the shifter also includes controls and indicators for a column braking system as described in my copending U.S. patent application Ser. No. 07/761,179, filed concurrently herewith.

As shown in FIG. 21, the shifter 800 is generally divided into a power supply section 836 and a shift control section 838. The power supply section 836 includes a battery pack 839 preferably using 10 sub c-cells hooked in series and having a capacity of 900 mA hours, or other suitable battery source. A separate A/C line cord can be connected to a socket 841 (FIG. 20) on the flat panel of the shifter 800 for charging. The socket 841 is wired to a transformer 842 which in turn is connected to a power supply circuit board 850 (FIG. 21).

On the other side of the shifter 800, as shown in FIGS. 20 and 21, is a shift control circuit board 860. A D/C motor 862 drives a sprocket 866 on an output shaft 865 through a gear reduction box 864. The D/C motor 862 is preferably a 24 watt, 12 V DC motor running from 100-200 RPM, with the gear reduction box 864 providing a 43:1 reduction. The gear box and motor are advantageously mechanically isolated from the housing to lessen vibration. A belt 863 links sprocket 866 to a clutch sprocket 867 on an electrically controlled clutch 868. The clutch 868 is in turn linked to a drive shaft 870 having a drive gear 871. A bearing block 872 supports the drive shaft 870 adjacent to the drive gear 871. A gear segment 873 is attached to the shift bar 275 of the steering system of the camera dolly. The gear segment 873 extends through a slot in the housing cover and engages the drive gear 871.

At the end of the drive shaft 870 opposite to the clutch 868 is a detector plate 874 having a hub 875 attached to the drive shaft 870 by a set screw, as shown in FIGS. 22A and 22B. A sector flange 876 extends from the hub 875. Optical interrupter detectors 880 and 882 attached to the shift control circuit board 860 project downwardly on either side of the detector plate 874, to detect whether the extended sector flange 876 of the detector plate is positioned in between the optical detectors, to thereby determine the steering mode of the steering system and to control the amount of rotation of shaft 870.

Figure 25B:
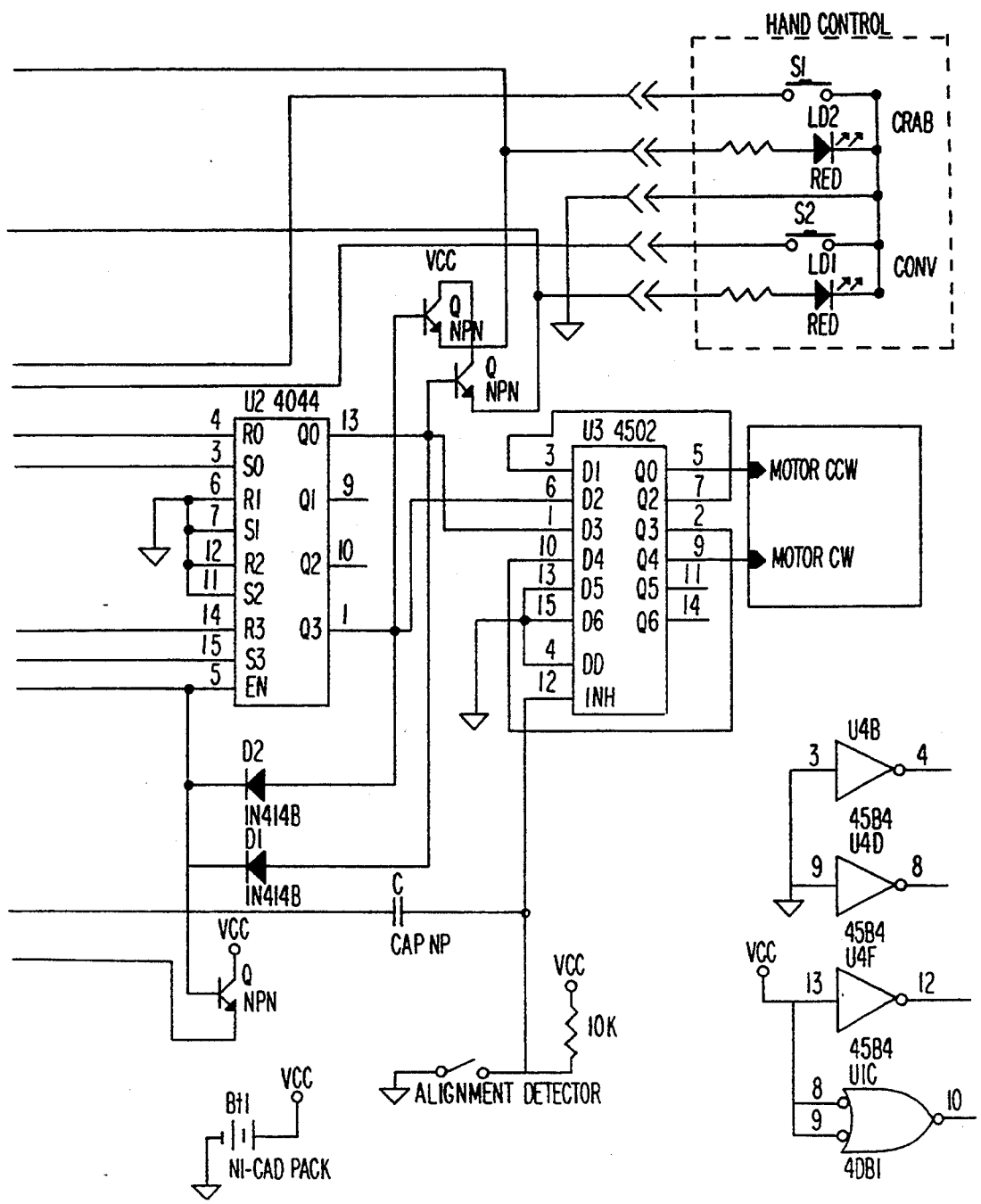
FIG. 25 is a schematic drawing of the preferred shifter logic circuitry.
Figure 26:
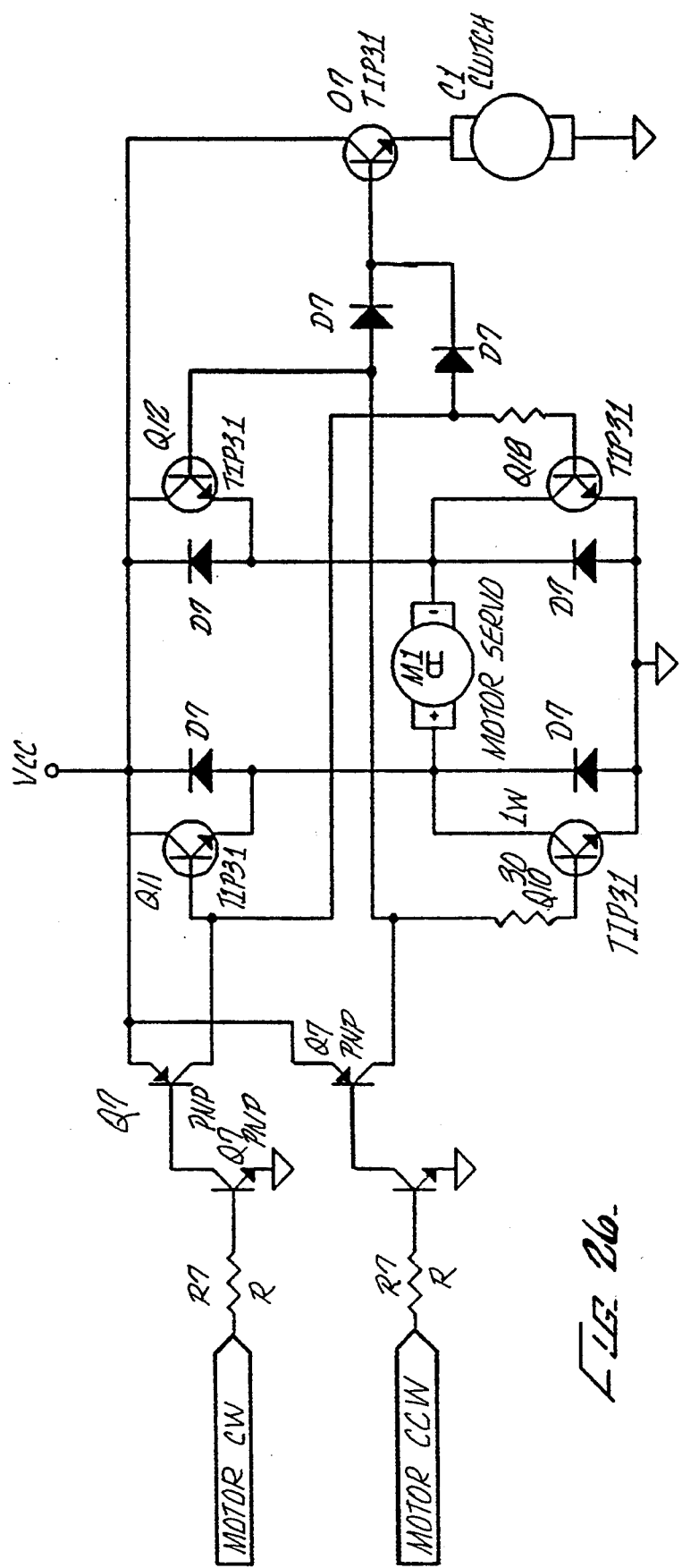
FIG. 26 is a schematic drawing of the preferred shifter drive circuitry.

FIGS. 25 and 26 schematically illustrate the shift control circuit board 860, and the connections to the motor and clutch. The power supply circuit board 850 provides the voltages as required by the circuitry of FIGS. 25 and 26.

FIG. 24 is a flow chart illustrating the logic of the control circuitry of FIG. 25. If conventional steering is selected, i.e., by pressing the conventional steering mode selection switch 824, or by use of the remote hand control 830, the timer on the control circuit board 860 is set and the register U2 set to conventional steering. Next, the circuitry determines whether the steering is aligned into a shiftable position, i.e. to a 0° or 180° position. This information is provided by the wheel angle detector 804 which is linked to the control circuit board 860 through cable 809. Specifically, switch 808 is closed and provides a positive enable condition only when the roller 810 protrudes into one of the notches 807 on the notch plate 806. If the timer runs out before the wheels are brought into a shiftable position, the system returns to idle standby. The timer is preferably set approximately 12 seconds. If the dolly wheels are not aligned within that period, generally a steering mode shift would no longer be desired.

If the wheels are aligned into a shiftable position, a shift will take place and additional time is added to the timer to prevent an inadvertent return to idle standby during the shift sequence. The clutch is electrically locked and the motor is run in the conventional steering direction. Referring to FIGS. 21–23, the drive shaft 870 rotates causing the shift bar 275 to also rotate in an opposite sense, thereby shifting the steering system from crab to conventional steering mode. The motor continues to run until the conventional steering optical interrupter 880 detects that the shaft 870 has moved into the conventional steering mode position. The shifter 800 similarly shifts from conventional steering mode to crab steering mode following the sequence illustrated on the left side of FIG. 24.

The shifter 800 permits the dolly grip to shift between steering modes, e.g., using the remote hand control, without leaving his location. In addition, the steering mode can be shifted with the grip at any position around the dolly. Since there is no need for the grip to lift a foot off the ground for shifting or remove a hand from the dolly for shifting, a film sequence can continue smoothly through a shift. The electronic shifter 800 also shifts quickly, smoothly and quietly to avoid jarring the camera dolly or making noise.

Figure 29:
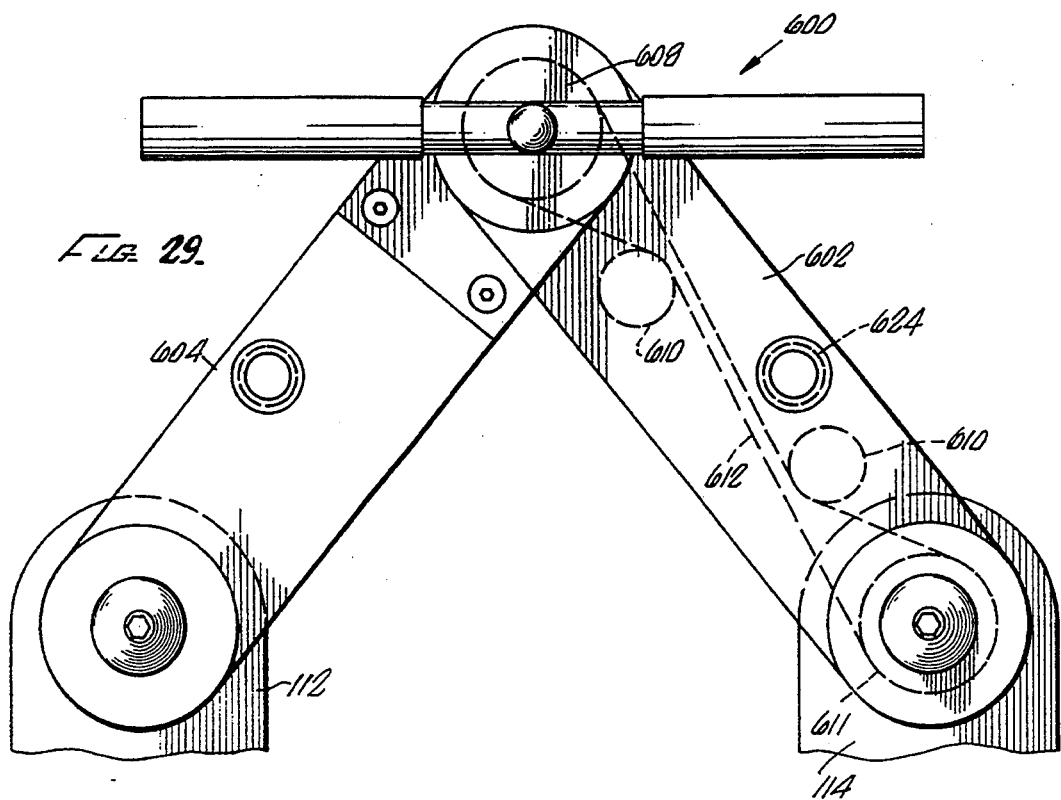
FIG. 29 is a top elevation view of a steering bracket accessory attached to the dolly.
Figure 30:
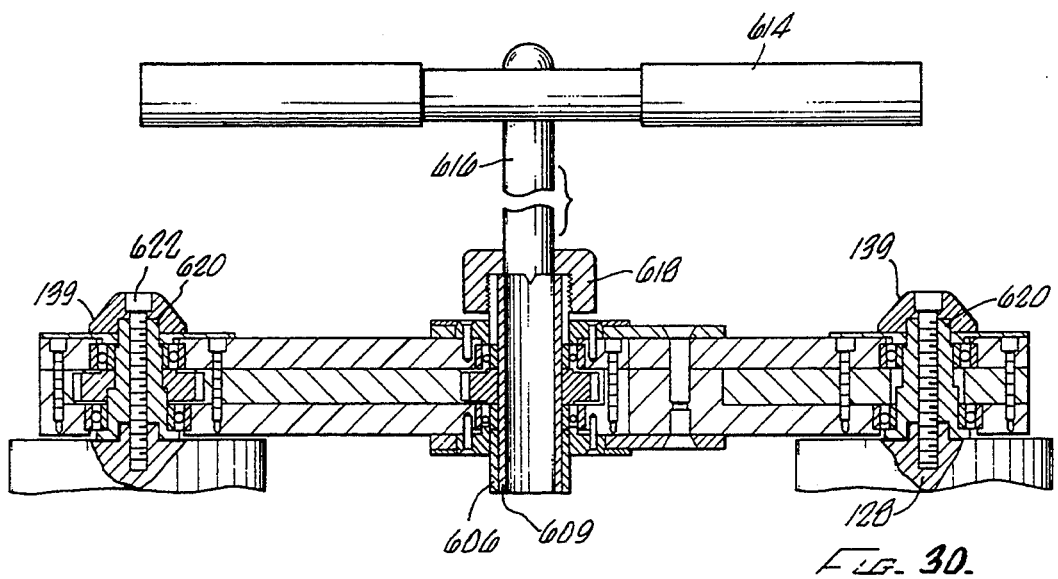
FIG. 30 is a partial section view thereof.

In certain applications, it is desirable to be able to push and steer the dolly from behind, without using the steering wheel 252. A steering bracket accessory 600, as shown in FIGS. 29 and 30, is provided for this purpose. The steering bracket 600 has a first arm 602 pivoted to a second arm 604 at a pivot shaft 606. Bushings 624 for receiving accessories are provided on each of the arms 602, 604 of the steering bracket. A steering shaft 609 within the pivot shaft 606 is attached to a first sprocket 608. A second sprocket 611 is provided at the end of the first arm 602 and is drivably linked to the first sprocket by a belt 612. Idlers 610 are provided to tension the belt 612. A handle 614 is joined to a shaft 616. The shaft 616 is long enough to place the handle 614 at a comfortable height for the dolly grip and is preferably adjustable in length. The shaft 616 is releasably attached to the steering shaft 609 through a coupling 618. A capstan 620 is attached to and turns with the second sprocket 608. Thus, the capstan 620 turns identically with the handle 614. The capstan 620 has a square recess at its lower end adapted to fit over the square upper section of the kingpin 128. (See FIGS. 3 and 5). The belt 612 connects to and drives only the capstan shown on the right side of FIGS. 29 and 30 (which capstan attaches to the rear left dolly kingpin).

To install the steering bracket 600, the fasteners 136 in the two rear kingpins 128 are removed along with the caps 139. The square recesses in the capstans 620 at the ends of the first and second arms, are placed over and engaged onto the square kingpin ends. The caps 139 are then replaced and extended fastening bolts 622 are passed through the caps 139 and capstan 620, and are threaded into the kingpins. The steering bracket 600 is then rigidly attached to the rear dolly legs.

The first and second arms 602, 604 of the steering bracket 600 can open or close together to adapt to the various leg positions shown in FIG. 2. Movement of the handle 614 of the steering bracket 600 is transmitted through the belt 612, sprocket 611, and capstan 620 to the rear left kingpin 128. With reference to FIGS. 2 and 3, the steering movement from the handle 614 works backwards through the steering system, such that the dolly can be steered in crab or conventional steering mode, with the legs in any position.

Thus, while several embodiments have been shown and described, it will be apparent to those skilled in the art that various modifications and additions can be made without departing from the spirit and scope of the invention.

I claim:

1. A steering mode shift apparatus for shifting a steering system of a camera dolly between a first steering mode wherein all wheels of the dolly are steered together and a second steering mode, wherein only the front wheels or the rear wheels of the dolly are steered, comprising:
    a housing;
    a first shift plate slidably supported on a first end of a shaft;
    a second shift plate slidably supported on a second end of the shaft spaced apart from the first end thereof;
    a support disposed at least partially around the shaft and fixed to the housing;
    a first steering mode sprocket having a pin bore, rotatably mounted about the shaft;
    a second steering mode sprocket having a pin bore, rotatably mounted about the shaft;
    a first steering mode sprocket shift pin extending from the second shift plate through the support;
    a second steering mode sprocket shift pin extending from the first shift plate and reversibly engageable into the pin bore in the second steering mode sprocket; and
    means for reversibly shifting the second shift plate between a first position wherein the second shift plate is spaced apart from the first steering mode sprocket and the first steering mode sprocket shift pin is withdrawn from the first steering mode sprocket allowing it to rotate about the shaft and wherein the second steering mode sprocket shift pin engages the second steering mode sprocket, to a second steering mode position wherein the second shift plate is adjacent the support with the first steering mode sprocket shift pin engaging the first steering mode sprocket and preventing rotation thereof and wherein the second steering mode sprocket shift pin is disengaged from the second steering mode sprocket which is free to rotate.

2. The apparatus of claim 1 further comprising a center shift pin between the first steering mode sprocket shift pin and the second steering mode sprocket shift pin.

3. The apparatus of claim 1 wherein said means for reversibly shifting comprises a shift linkage including a pivot fork attached to the shaft, a shift linkage shaft attached to the pivot fork, and a shift handle for rotating the shift linkage shaft.

4. The apparatus of claim 1 further comprising a drive sprocket rigidly attached to a tubular axle positioned around the center shaft.

5. The apparatus of claim 1 wherein said first shift plate has a pin slidably engaged to a slot in the center shaft.

6. A camera dolly/pedestal having a steering system comprising:
    a vertically displaceable steering wheel;
    a telescoping shaft linking the steering wheel to a steering drive sprocket;
    a primary shift assembly having a crab sprocket, a two wheel steering mode sprocket, and means for alternately linking the steering drive sprocket with one of the crab sprocket and two wheel steering mode sprocket;

a steering corrector linked to the two wheel steering mode sprocket;

a crab drive line; and a secondary sprocket shift assembly having a crab sprocket, a two wheel steering mode sprocket and means for alternately linking the two wheel steering mode sprocket thereof to the steering corrector and the crab sprocket to the crab drive line.

7. A camera support having a steering system for steering pivotable wheels, the steering system operable in a first or crab steering mode and in a two wheel or second steering mode wherein only wheels at two corners of the dolly are steered, comprising:

a shiftable position wheel angle detector for detecting when the wheels are in a shiftable position;

an automatic shift mechanism for automatically shifting the steering system between first and second steering modes; and a processor connected to the shiftable position wheel angle detector and shift mechanism for controlling actuation of the shift mechanism.

8. The camera support of claim 7 wherein the shift mechanism comprises a motor and clutch linked to a shift shaft.

9. The camera support of claim 8 further comprising a gear segment attached to the drive shaft.

10. The camera support of claim 7 further comprising means for detecting the steering mode of the camera support.

11. The camera support of claim 7 further comprising a remote switch linked to the processor.

12. The camera support of claim 7 further comprising a timer linked to the processor.

13. The camera support of claim 7 further comprising a housing containing the detector, shift mechanism and processor and releasably attachable to the camera support.

14. An automatic steering mode shifter for shifting a steering system of a camera dolly between a first or crab steering mode wherein all wheels of the dolly are steered and a second or two wheel steering mode wherein only two dolly wheels or wheel sets are steered, comprising:

a housing;

means for attaching the housing to a camera dolly;

an electronic processor within the housing;

a shift mechanism substantially within the housing and connected to the processor;

a wheel angle detector connected to the processor for detecting when the wheels are aligned into a shiftable position; and a switch connected to the processor for initiating shifting.

15. An automatic steering mode shifter for shifting a steering system of a camera dolly between a first or crab steering mode and a second or two wheel steering mode comprising:

a housing;

an electronic processor within the housing;

a shift mechanism substantially within the housing and connected to the processor, the shift mechanism including:

an electric motor, a clutch connected to the motor, a shift shaft connected to the clutch, and a gear segment attached to the shift shaft and extending at least partially out of the housing;

a wheel alignment position detector connected to the processor; and a switch connected to the processor for initiating shifting.

16. The shift of claim 15 further comprising a detector plate attached to the shift shaft and positioned between a pair of optical sensors linked to the processor, for sensing positions of the shift shaft.

17. A camera dolly having steerable wheels and a steering mode shifter for shifting the steering of the wheels between a first or crab, steering mode and a second or two wheel steering mode comprising:

a shifter housing;

a tubular axle supported vertically within the housing;

a crab steering sprocket rotatably mounted on the tubular axle;

a two wheel steering sprocket rotatably mounted on the tubular axle;

a drive sprocket fixed to the tubular axle; and means for alternately irrotatably attaching the crab steering sprocket and the two wheel steering sprocket to the tubular axle, said means comprising:

a shift fork pivotably attached to the housing;

a shaft slidably positioned within the tubular axle and linked to the shift fork;

a plate attached to the shaft; and shift pins supported by the plate and extendible through openings in the two wheel steering sprocket and the crab steering sprocket.

* * * * *